(12) United States Patent
Takahiko et al.

(10) Patent No.: US 7,318,494 B2
(45) Date of Patent: Jan. 15, 2008

(54) SNOW VEHICLE SUSPENSION SYSTEM

(75) Inventors: Kubota Takahiko, Iwata (JP);
Masanori Yoshihara, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 328 days.

(21) Appl. No.: 10/745,301

(22) Filed: Dec. 22, 2003

(65) Prior Publication Data

US 2004/0195024 A1   Oct. 7, 2004

(30) Foreign Application Priority Data

| Dec. 20, 2002 | (JP) | ............................. 2002-369856 |
| Dec. 20, 2002 | (JP) | ............................. 2002-369857 |
| Dec. 26, 2002 | (JP) | ............................. 2002-378019 |

(51) Int. Cl.
*B62M 27/02* (2006.01)

(52) U.S. Cl. .................... 180/193; 180/190; 180/192

(58) Field of Classification Search ................ 180/190, 180/192, 193
See application file for complete search history.

(56) References Cited

U.S. PATENT DOCUMENTS

| 3,613,811 | A | 10/1971 | Brandli |
| 3,721,308 | A | 3/1973 | Brandli et al. |
| 3,773,126 | A | 11/1973 | Irvine |
| 3,784,263 | A | 1/1974 | Hendrickson et al. |
| 3,788,412 | A | 1/1974 | Vincent |
| 3,863,727 | A | 2/1975 | Michrina |
| 4,133,400 | A | 1/1979 | Shiraishi |
| 4,284,161 | A | 8/1981 | Blass ........................ 180/184 |
| 4,301,884 | A | 11/1981 | Taylor |
| 4,305,476 | A | 12/1981 | Blass et al. |
| 4,314,618 | A | 2/1982 | Tamura |
| 4,407,386 | A | 10/1983 | Yasui et al. |
| 4,462,480 | A | 7/1984 | Yasui et al. |
| 4,518,056 | A | 5/1985 | Kobayashi |
| 4,591,173 | A | 5/1986 | Marier |
| 4,892,164 | A | 1/1990 | Yasui et al. |
| 4,892,165 | A | 1/1990 | Yasui et al. |

(Continued)

FOREIGN PATENT DOCUMENTS

CA      2298749      10/2001

(Continued)

OTHER PUBLICATIONS

U.S. Appl. No. 10/744,611, filed on Dec. 22, 2003 by Masanori Yoshihara.

(Continued)

*Primary Examiner*—Christopher P. Ellis
*Assistant Examiner*—John Walters
(74) *Attorney, Agent, or Firm*—Knobbe Martens Olson & Bear LLP

(57) ABSTRACT

A vehicle comprises a frame and a slide rail disposed below the frame for guiding a drive track along a road surface. An arm has a first portion pivotally coupled to the frame at a frame pivot location and a second portion pivotally coupled to the slide rail at a rail pivot location. Vertical movement of the slide rail causes a length of the arm between the frame pivot location and the rail pivot location to extend or contract. The vehicle suspension system becomes increasingly stiffer as the deflection of the slide rail increases, to contribute to a more comfortable ride and to reduce the risk of bottoming-out.

20 Claims, 25 Drawing Sheets

U.S. PATENT DOCUMENTS

| | | | |
|---|---|---|---|
| 4,917,207 A | 4/1990 | Yasui et al. | |
| 5,060,745 A | 10/1991 | Yasui et al. | |
| 5,265,692 A | 11/1993 | Mallette | |
| 5,586,614 A | 12/1996 | Kouchi et al. | |
| 5,660,245 A | 8/1997 | Marier et al. | |
| 5,667,031 A | 9/1997 | Karpik | |
| 5,692,579 A | 12/1997 | Peppel et al. | |
| 5,727,643 A | 3/1998 | Kawano et al. | |
| 5,730,242 A * | 3/1998 | Furusawa | 180/193 |
| 5,904,216 A | 5/1999 | Furusawa | |
| 5,944,134 A | 8/1999 | Peppel et al. | |
| 5,947,220 A | 9/1999 | Oka et al. | |
| 6,109,382 A | 8/2000 | Kubota | |
| 6,161,908 A | 12/2000 | Takayama et al. | |
| 6,206,124 B1 | 3/2001 | Mallette et al. | |
| 6,234,264 B1 * | 5/2001 | Boivin et al. | 180/193 |
| 6,283,241 B1 * | 9/2001 | Kubota | 180/193 |
| 6,354,391 B1 * | 3/2002 | Cormican | 180/193 |
| 6,450,279 B1 * | 9/2002 | Imamura | 180/193 |
| 6,450,280 B1 * | 9/2002 | Pepka et al. | 180/193 |
| 6,478,098 B2 | 11/2002 | Boivin et al. | |
| 6,631,778 B2 * | 10/2003 | Mallette | 180/193 |
| 6,823,957 B2 * | 11/2004 | Girouard et al. | 180/190 |
| 7,040,438 B2 | 5/2006 | Yoshihara | |
| 2003/0047368 A1 * | 3/2003 | Morin et al. | 180/190 |
| 2004/0195023 A1 | 10/2004 | Yoshihara | |

FOREIGN PATENT DOCUMENTS

| | | |
|---|---|---|
| EP | 1312538 A1 | 5/2003 |
| EP | 1336557 A2 | 8/2003 |
| JP | 54-051134 | 4/1979 |
| JP | 55-019648 | 2/1980 |
| JP | 55-022537 | 2/1980 |
| JP | 55-099475 | 7/1980 |
| JP | 55-156770 | 12/1980 |
| JP | 56-034577 | 4/1981 |
| JP | 56-079065 | 6/1981 |
| JP | 58-026684 | 2/1983 |
| JP | 62-214065 | 9/1987 |
| JP | 03-157283 | 7/1991 |
| JP | 03-276888 | 12/1991 |
| JP | 08-207838 | 8/1996 |
| JP | 09-142344 | 6/1997 |
| JP | 10-100981 | 4/1998 |
| WO | WO99/474111 | 9/1999 |

OTHER PUBLICATIONS

U.S. Appl. No. 10/745,397, filed on Dec. 22, 2003 by Masanori Yoshihara
Imamura et al. "Snowmobile Suspension System", Co-pending U.S. Appl. No. 10/698,980, filed Oct. 31, 2003.
European Search Report, May 7, 2004.
Yamaha Parts Catalogue Model Year 1997, Track Suspension 2, pp. A1 and C11.
Yamaha Parts Catalogue Model Year 2001, *Mountain-Max*, MM600F, MM700F,Track Suspension 2, pp. A1 and D9.
Yamaha Parts Catalogue Model Year 2001, *Bravo*, BR250TF, Track Suspension 2, pp. A1 and C10.
Polaris Parts Manual 2002, 700 Classic Edge, Model #S02ND7CS, Rev. 01, pp. B6-B11.
Polaris Parts Manual 2002, WideTrak LX Model #S02SU4BS, Euro Widetrak LX Model #S02SU4BE Rev.01, pp. B3-B7.
Polaris Parts Manual 2002, 120 XC SP, Model #S02WB1AS Rev. 01, p. A11.
Polaris Parts Manual 2002, 600 Classic Touring Model #S02ST6ES, Model #S02ST6ESA, Rev. 01, pp. B9-B12.
Polaris Parts Manual 2002, 800 RMK F/O 151, Model #S02NL8CS, Built After Mar. 1, 2001; 800 RMK 151 Stock, Model #S02NL8CSA, Rev. 01, B8-B11.
Polaris Parts Manual 2002, Indy 340 Touring, Model #S02LT3AS, Rev. 01, pp. B3-B6.
Polaris Parts Manual 2002, Indy 340 Deluxe Model #S02LD3AS, Rev. 01, pp. B5-B8.
Polaris Parts Manual 2002, Sport Touring, Model #S02SU5BS; Sport Touring ES Euro, Model #S02SD5BE, Rev. 02, B5-B8.
Polaris Parts Manual 2002, 800 SC SP F/O, Model #S02NP8CS, Built After Mar. 1, 2001, 800 SC SP M-10 F/O, Model #S02NE8CS; 800 SC SP Stock, Model #S02NP8CSA (B), pp. B10-B14, C1.
Polaris Parts Manual 2002, 800 XCR, Model #S02SB8AS, Rev. 01, pp. B9-B14, C1-C6.

* cited by examiner $$F = F_F \cos \beta + F_R \cos \gamma = k(\theta - \theta_0) \left( \frac{\cos \beta}{L_1} + \frac{L_2'}{L_3 L_2} \cos \alpha \cdot \cos \gamma \right)$$

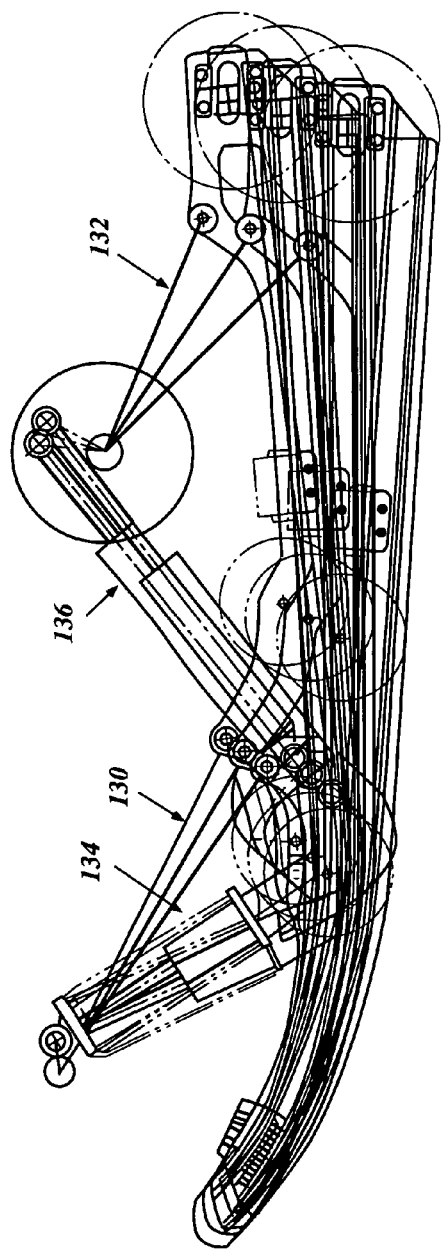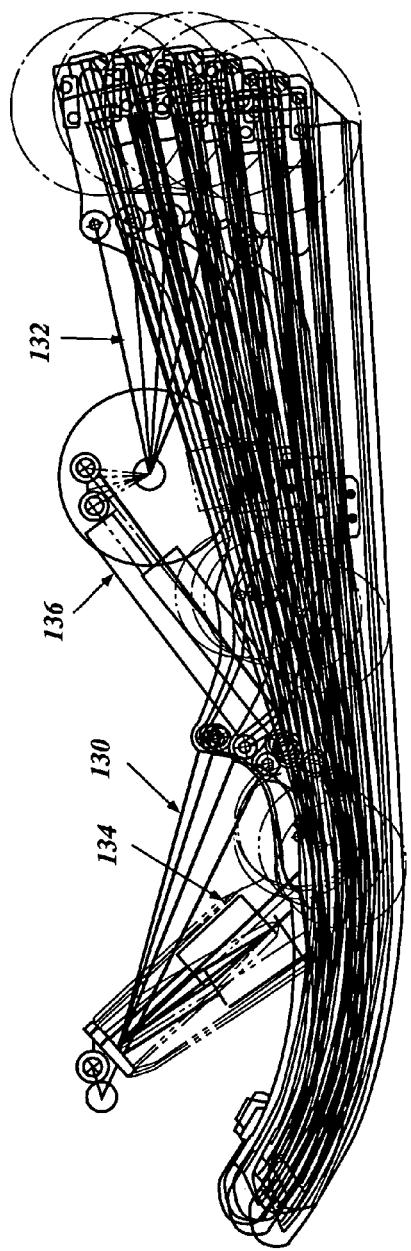

SNOW VEHICLE SUSPENSION SYSTEM

RELATED APPLICATIONS

This application is based upon and claims the priority of Japanese Patent Application No. 2002-369856, filed on Dec. 20, 2002, Japanese Patent Application No. 2002-378019, filed Dec. 26, 2002 and Japanese Patent Application No. 2002-369857, filed Dec. 20, 2002 and which are hereby incorporated by reference in their entireties.

BACKGROUND OF THE INVENTION

1. Field of the Invention

The present application generally relates to suspension systems. More specifically, the present application relates to a suspension system for snow vehicles.

2. Description of the Related Art

A typical snow vehicle is designed to run on uneven snow surfaces and is thus provided with a suspension device for absorbing shocks caused by the unevenness of the snow surfaces.

Some suspension devices have a slide rail supported by a body frame via front and rear arms. An extendable shock absorber is interposed between the slide rail and the body frame. In some suspension devices, the rear arm is constituted of two links. One example of a suspension device is disclosed in JP-A-08-207838. However, various stopper mechanisms must be provided in a number of positions to regulate the movement of the rear arm, which increases the number of parts, weight and cost of the vehicle.

In some suspension devices, the point where the rear arm is connected to the slide rail is movable in the axial direction of the rear arm. One example of a suspension device is disclosed in U.S. Pat. No. 5,667,031. The tension applied to the track belt can be held generally constant as the slide rail is deflected; however, the rate of change of the spring reaction does not increase as the deflection of the slide rail increases.

SUMMARY OF THE INVENTION

One aspect of the invention disclosed herein includes the realization that snow vehicle suspension systems can be improved to provide a more comfortable ride and to reduce bottoming-out of the shock absorbers where the spring reaction characteristic of the suspension system gets progressively larger as the amount of deflection of the slide rail increases. In some embodiments, the spring reaction characteristic can be changed depending upon the user's preference.

Thus, in accordance with another aspect of the invention disclosed herein, a vehicle comprises a frame. A slide rail is disposed below the frame for guiding a drive track along a road surface. A front suspension arm has a first portion pivotally coupled to the frame at a front frame pivot location and a second portion pivotally coupled to the slide rail at a front rail pivot location. A rear sliding arm has a first portion pivotally coupled to the frame at a rear frame pivot location and a second portion pivotally coupled to the slide rail at a rear rail pivot location. A front shock absorber is interposed between the slide rail and the frame. A rear shock absorber is interposed between the slide rail and the frame. A linkage system couples the slide rail, the front suspension arm, and the front and rear shock absorbers. A spring member has a first portion mounted to the frame and a second portion extending from the first portion generally toward the slide rail. A first spring support member is coupled with the slide rail at a first spring support location and arranged to support the second portion of the spring member in a first position. A second spring support member is coupled with the vehicle at a second spring support location and arranged to support the second portion of the spring member in a second position.

In another aspect, a vehicle comprises a frame. A slide rail assembly is disposed below the frame for guiding a drive track along a road surface. The slide rail assembly has at least a pair of slide rails. At least one cross member extends between the pair of slide rails. An arm has a first portion pivotally coupled to the frame at a frame pivot location and a second portion pivotally coupled to the cross member at a location between the pair of slide rails. The first and second portions are movable relative to each other such that vertical movement of the slide rail causes a length of the arm between the frame pivot location and the rail pivot location to extend or contract.

In still another aspect, a vehicle has a frame and a slide rail. An arm has a first portion pivotally coupled to the frame at a rear frame coupling location and a second portion pivotally coupled to the slide rail at a rear rail coupling location. The method of operation of the vehicle comprising the steps of deflecting the slide rail within a first range whereby the distance between the rear frame coupling location and the rear rail coupling location decreases. The method additionally comprising deflecting the slide rail within a second range wherein the distance between the rear frame coupling location and the rear rail coupling location is maintained generally constant.

BRIEF DESCRIPTION OF THE DRAWINGS

These and other features, aspects and advantages of the present invention will be better understood with reference to preferred embodiments, which are illustrated in the accompanying drawings. The illustrated embodiments are merely exemplary and are not intended to limit the scope of the present invention.

FIGS. 14(a) and 14(b) are schematic views illustrating the operations of the rear sliding arm of the suspension system of FIG. 3.

DETAILED DESCRIPTION OF THE PREFERRED EMBODIMENT

Figure 1:
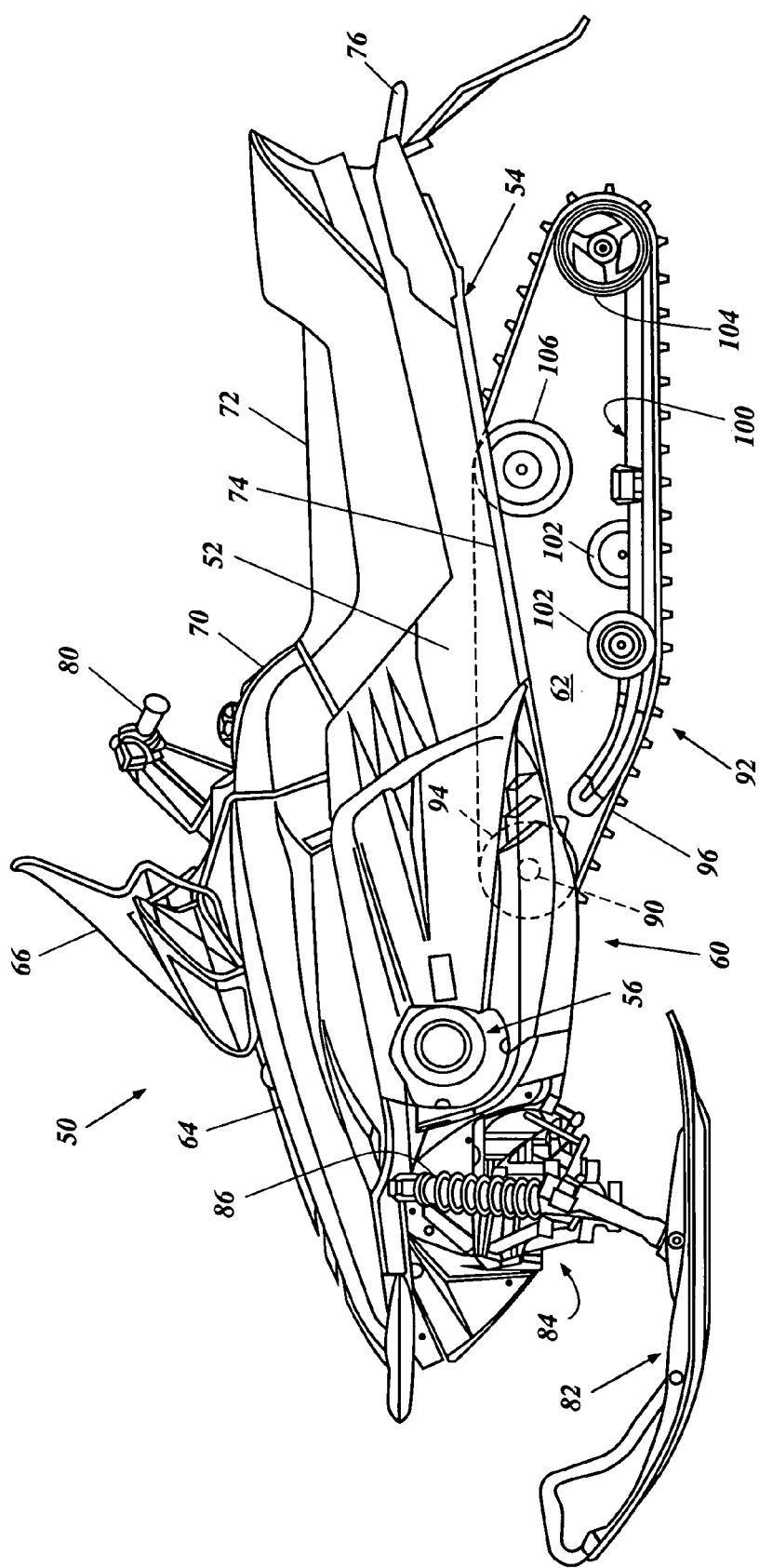
FIG. 1 is a side elevational view of a snow vehicle according to one embodiment of the present invention.

With reference to FIG. 1, a snow vehicle having certain features, aspects and advantages of the present invention is described below. A snow vehicle represents an application for which many features, aspects and advantages of the present invention provide particular advantages. Nevertheless, certain features, aspects and advantages of the present invention can be used with other types of vehicles.

As shown in FIG. 1, the vehicle 50 comprises a vehicle body 52, including a body frame 54, an engine 56 mounted to the vehicle body 52, and a drive system 60 coupled with a rear suspension system 62 mounted to the body frame 54.

The vehicle body 52 carries a number of other components of the vehicle 50. For example, a vehicle body cover 64 is disposed over the vehicle body 52. The vehicle body cover 64 defines, in part, an engine compartment in which the engine 56 is mounted.

A windshield 66 is disposed over a mid-portion of the vehicle body cover 64. Rearward of the windshield 66, a fuel tank 70 is mounted to the vehicle body 52 in a manner that allows the vehicle body cover 64 and the fuel tank 70 to appear to blend together. A seat 72 is mounted to the vehicle body 52, rearward of the fuel tank 70. The seat 72 preferably is a saddle-type seat. Footrests 74 for supporting the rider's feet are formed on the body frame 54 on both right and left sides of the vehicle 50 below the seat 72.

A grab bar 76 is disposed rearward from the seat 72. The grab bar 76 comprises a grabbing portion that can be used to raise a rear portion of the vehicle 50 for turning and maneuvering when the vehicle 50 is not being ridden. The illustrated grab bar 76 is generally U-shaped and is mounted in a generally horizontal manner. However, other forms of grab bars can be used.

A steering handle assembly 80 is disposed forward of the seat 72 and the fuel tank 70. The steering handle assembly 80 can carry appropriate controls and can be coupled to a pair of front skis 82. Manipulation of the steering handle assembly 80 causes the direction of the vehicle 50 to be altered. The front skis 82 are mounted to the vehicle body 52 through a front suspension assembly 84. Any suitable front suspension assembly 84 can be used. The front suspension assembly 84 preferably comprises front ski shock absorbers 86.

The engine 56 in the illustrated arrangement is a four-cycle, multi-cylinder engine mounted within the engine compartment. Of course, other types and sizes of engines can be used. The engine 56 has an engine body that is supported on the vehicle body 52. An intake system is configured to introduce air and fuel into the engine body. In the illustrated embodiment, the intake system comprises an air filter and a carburetor. A fuel injection system could be used instead to produce the fuel charge. An exhaust system is configured to discharge exhaust gases to the atmosphere after combustion in the engine. The exhaust system comprises exhaust pipes and a muffler.

The engine 56 drives a transmission system (not shown), which preferably is a continuously variable transmission. Other transmissions can also be used. The transmission system is coupled with the drive system 60. The drive system 60 comprises a drive shaft 90 coupled with the transmission system. The drive shaft 90 powers a drive track 92. The drive track 92 generally comprises one or more drive wheels 94 and a track belt 96. The drive wheel 94 provides a motive force to the track belt 96 which is commonly used in the snow vehicle industry.

With continued reference to FIG. 1, the track belt 96 is guided around a preferred path on a slide rail assembly 100, lower guide wheels 102, and rear suspension wheels 104. The slide rail assembly 100 preferably supports the lower guide wheels 102 and the rear suspension wheels 104. Upper guide wheels 106 preferably are mounted to the vehicle body 52 and are configured to help define the path for the track belt 96. The rear suspension system 62 mounts these components to the vehicle body 52. The rear suspension system 62 will be described in greater detail below.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

Figure 2:
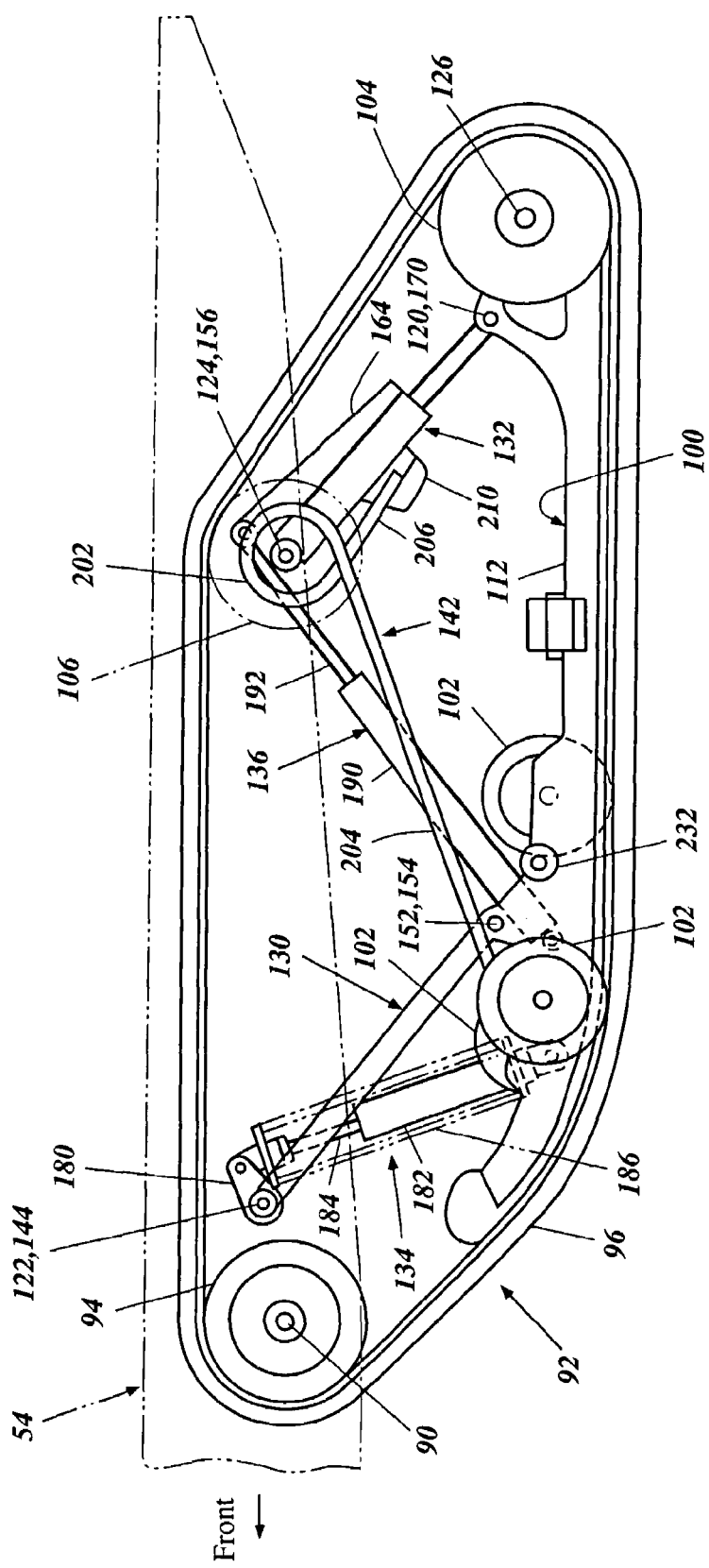
FIG. 2 is a side elevational view of a suspension and drive assembly of the vehicle of FIG. 1.
Figure 3:
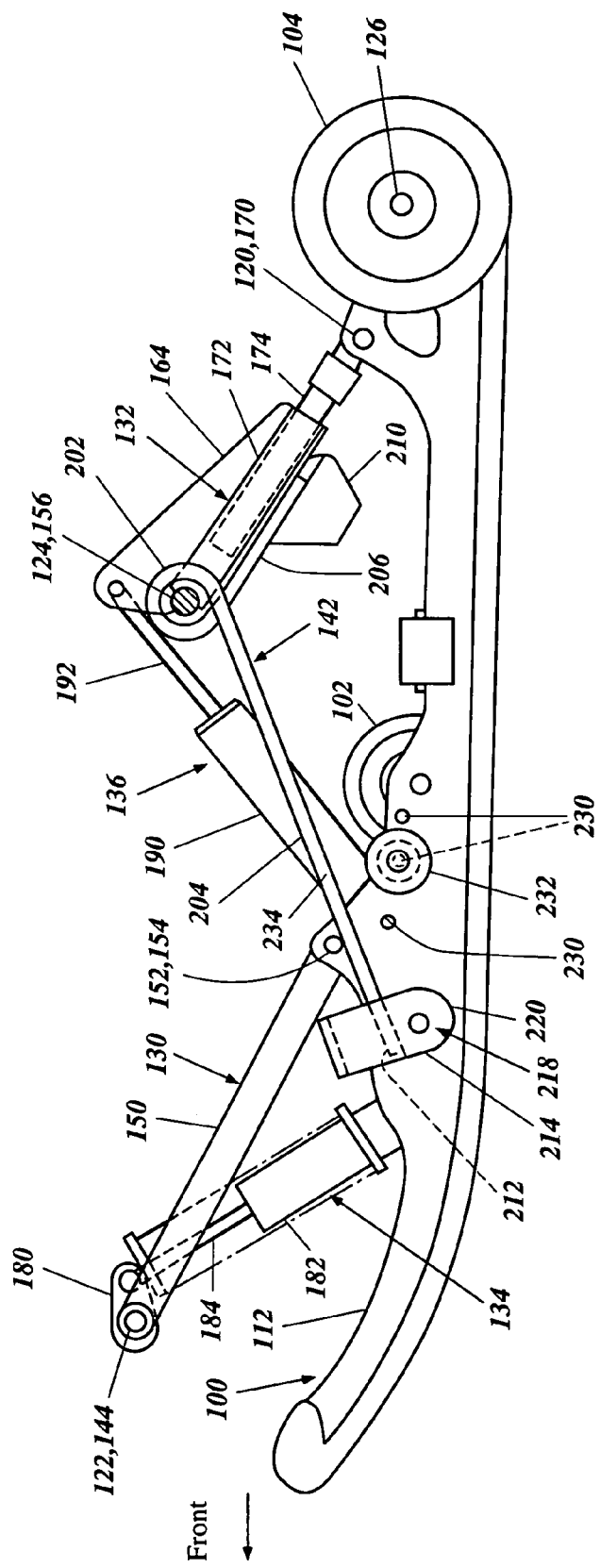
FIG. 3 is a side elevational view of the suspension system of the assembly shown in FIG. 2.
Figure 4:
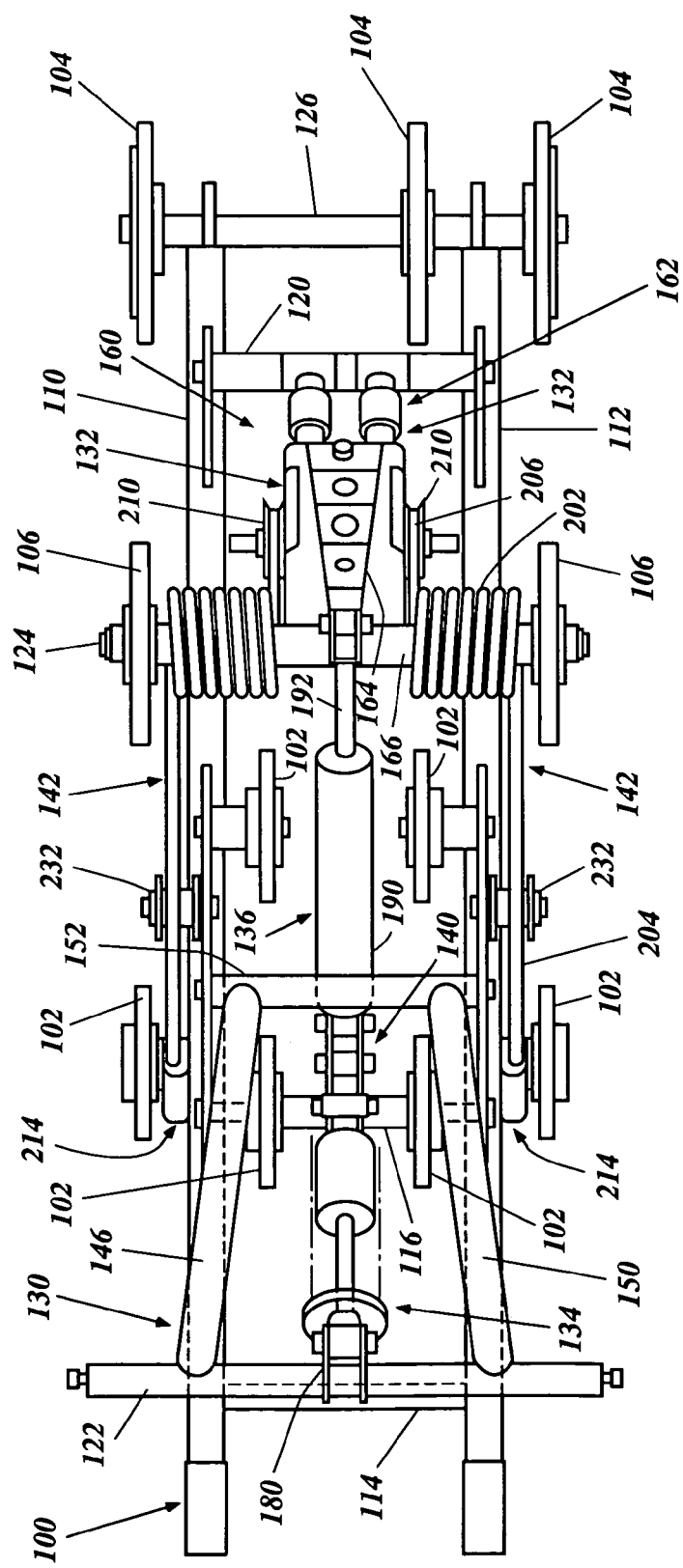
FIG. 4 is a plan view of the suspension system of FIG. 3.

FIGS. 2-8 further illustrate portions of the rear suspension assembly for the snow vehicle of FIG. 1. With reference to FIGS. 2-4, the drive track 92 is located toward the rear of the body frame 54. The drive track 92 comprises the track belt 96 extending around the drive wheel 94, the slide rail assembly 100, the lower guide wheels 102 and the upper guide wheels 106. The drive track 92 has a generally parallelogram shape when viewed from a side. To drive the snow vehicle 50, the engine 56 drives the drive shaft 90 of the drive wheel 94 to rotate the track belt 96 of the drive track 92. The snow vehicle 50 can be guided by pivoting the front skis 82 through operation of the steering handle assembly 80.

The slide rail assembly 100 guides the track belt 96 along a snow surface. The slide rail assembly 100 comprises a right side rail 110 and a left side rail 112. The right and left side rails 110, 112 extend in the longitudinal direction of the vehicle 50. The slide rail assembly 100 also comprises a front cross shaft 114, an intermediate cross shaft 116, and a rear cross shaft 120. The front, intermediate, and rear cross shafts 114, 116, 120 extend laterally between the right side rail 110 and the left side rail 112. Pairs of right and left lower guide wheels 102 are pivotally supported on the slide rail assembly 100 for guiding and supporting a lower part of the track belt 96.

An upper arm shaft 122 extends laterally from one side of the body frame 54 to another near the front of the vehicle 50. A first wheel shaft 124 extends laterally from one side of the body frame 54 to another near the rear of the vehicle 50. The right and left upper guide wheels 106 are rotatably mounted on the first wheel shaft 124, which is secured to the body frame 94. The rear suspension wheels 104 are mounted on a second wheel shaft 126 disposed at the rear ends of the right and left side rails 110, 112. The rear suspension wheels 104 are adjustable in the longitudinal direction.

The rear suspension system 62 is interposed between the body frame 54 and the slide rail assembly 100. The suspension system 62 comprises a front suspension arm 130 for pivotally supporting the slide rail assembly 100. The suspension system 62 can comprise a rear sliding arm 132. The suspension system 62 can also comprise front and rear shock absorbers 134, 136 for reducing the impact forces caused by variations in the travel surface and for absorbing vehicle vibrations. The suspension system 62 preferably comprises a linkage mechanism 140 coupling front and rear shock absorbers 134, 136 with the slide rail assembly 100. The suspension system 62 can also include spring members, such as, for example, a pair of right and left torsion springs 142. The suspension system 62 will be described in more detail below.

The front suspension arm 130 is coupled to the body frame 54 at a front frame coupling location 144. Preferably, the front suspension arm 130 is coupled to the body frame 54 via the upper arm shaft 122 at the front frame coupling location 144. The front suspension arm 130 extends generally rearward and downward from the front frame coupling location 144. The front suspension arm 130 comprises right and left front suspension arm members 146, 150. The front suspension arm 130 also comprises upper and lower arm shafts 122, 152 that extend laterally across the width of the vehicle 50. The upper arm shaft 122 is coupled to the upper ends of the right and left front suspension arm members 146, 150. The upper arm shaft 122 preferably is welded to the upper ends of the right and left front suspension arm members 146, 150. The lower arm shaft 152 is coupled to the lower ends of the right and left front suspension arm members 146, 150. The lower arm shaft 152 preferably is welded to the lower ends of the right and left front suspension arm members 146, 150. The front suspension arm 130 preferably has a generally trapezoid shaped configuration. The upper arm shaft 122 of the front suspension arm 130 is pivotally coupled to the body frame at the front frame coupling location 144. The lower arm shaft 152 of the front suspension arm 130 is pivotally coupled to the slide rail assembly 100 at a front rail coupling location 154.

The rear sliding arm 132 is coupled to the body frame 54 at a rear frame coupling location 156. Preferably, the rear sliding arm 132 is coupled to the body frame 54 via the first wheel shaft 124 at the rear frame coupling location 156. The rear sliding arm 132 extends generally rearward and downward from the rear frame coupling location 156. The rear sliding arm 132 comprises right and left rear sliding arm members 160, 162. The right and left rear sliding arm members 160, 162 are arranged side by side and are disposed generally parallel to the front suspension arm 130. The right and left rear sliding arm members 160, 162 are coupled together via a supporting bracket 164 to enhance torsional rigidity about their axes. In the illustrated embodiment, the rear sliding arm 132 is pivotally coupled to the body frame 54 at the rear frame coupling location 156 via a sleeve 166 rotatably coupled with the first wheel shaft 124. The rear sliding arm 132 is pivotally coupled to the slide rail assembly 100 at a rear rail coupling location 170 via the rear cross shaft 120.

Figure 5:
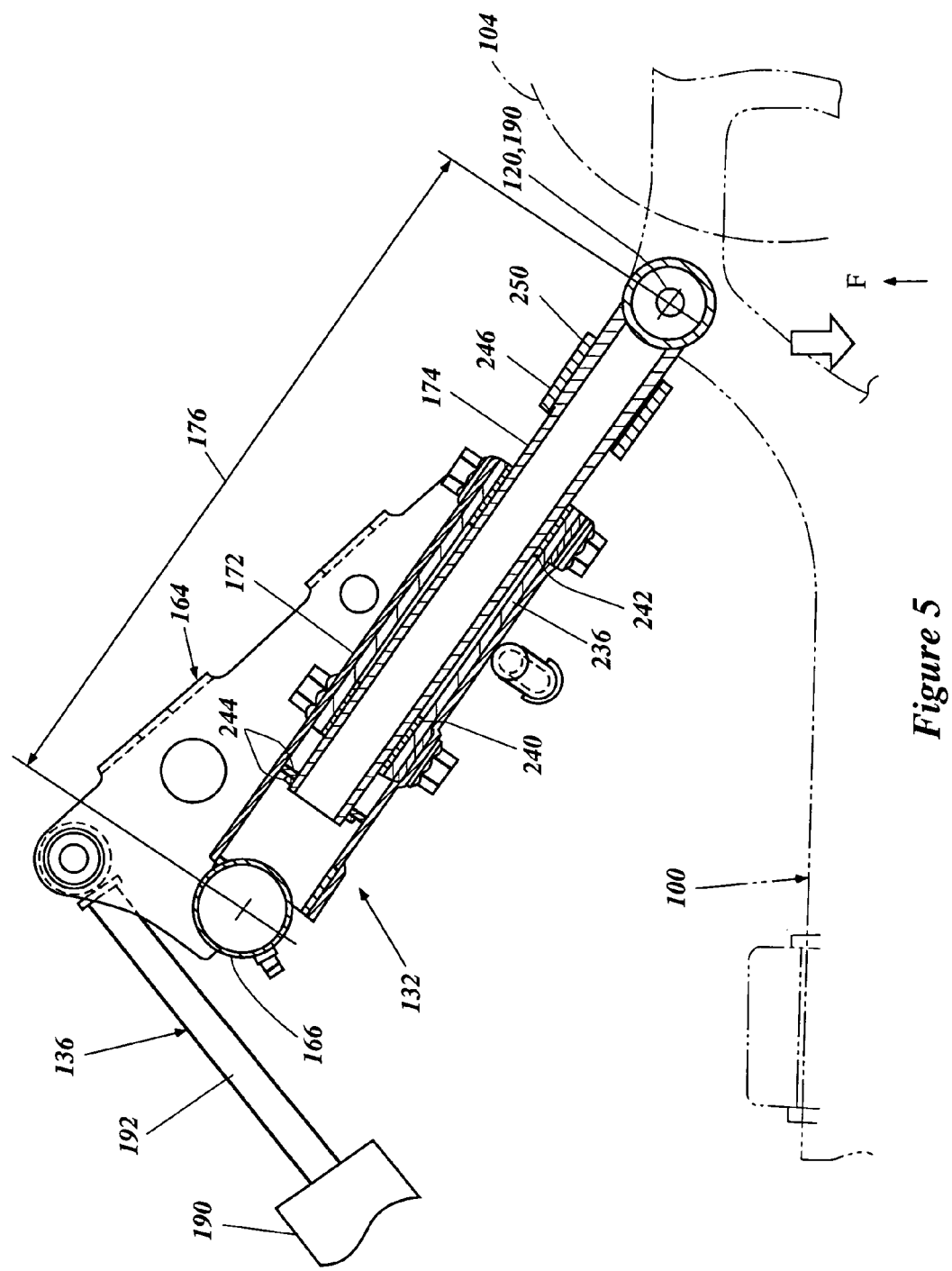
FIG. 5 is a sectional side view of a rear sliding arm of the suspension system of FIG. 3.

With reference to FIG. 5, the right and left rear sliding arm members 160, 162 each comprise a cylindrical member 172 and a cylindrical sliding shaft 174 coupled with the cylindrical member 172. The cylindrical member 172 and the cylindrical sliding shaft 174 are configured for relative movement along their longitudinal axes. The cylindrical member 172 and the cylindrical sliding shaft 174 move relative each other as the slide rail assembly 100 is deflected. The deflection of the slide rail assembly 100 causes relative movement of the cylindrical member 172 and the cylindrical sliding shaft 174 such that an arm length 176, of the rear sliding arm 132, is varied according to the deflection of the slide rail assembly 100. The rear sliding arm 132 is described further below.

With reference to FIGS. 2-4, the front shock absorber 134 is located generally in front of the front suspension arm 130. The front shock absorber 134 is coupled with the upper arm shaft 122 of the front suspension arm 130 via a coupling member. The coupling member preferably is a coupling bracket 180. The front shock absorber 134 extends generally rearward and downward from the upper arm shaft 122 of the front suspension arm 130. In the illustrated embodiment, the front shock absorber 134 comprises a cylinder 182 containing hydraulic oil, a rod 184 slidably coupled with the cylinder 182 via a damping mechanism (not shown), and a coil spring 186 interposed between the rod 184 and the cylinder 182. An upper end of the rod 184 is pivotally coupled to a first end of the coupling bracket 180. The coupling bracket 180 is fixed to the upper arm shaft 122. The first end of the coupling bracket 180 is oriented toward the rear of the vehicle 50 relative the upper arm shaft 122. A lower end of the front shock absorber 134 preferably is coupled to the slide rail assembly 100 through the linkage mechanism 140 as will be described below.

The rear shock absorber 136 is located generally behind the front suspension arm 130 and generally in front of the rear sliding arm 132. In the illustrated embodiment, a lower end of the rear shock absorber 136 is coupled to the lower end of the front shock absorber 134 and the slide rail assembly 100 through the linkage mechanism 140. The linkage mechanism 140 will be described further below. In the illustrated embodiment, the rear shock absorber 136 extends generally upward from the linkage mechanism 140 toward the rear of the vehicle 50. The rear shock absorber 136 comprises a cylinder 190 containing hydraulic oil, and a rod 192 slidably coupled with the cylinder 190 via a damping mechanism (not shown). An upper end of the rod 192 is pivotally coupled to an upper end of the supporting bracket 164 secured to the right and left rear sliding arms 160, 162. The upper end of the supporting bracket 164 is located generally above the rear frame coupling location 156.

Figure 6:
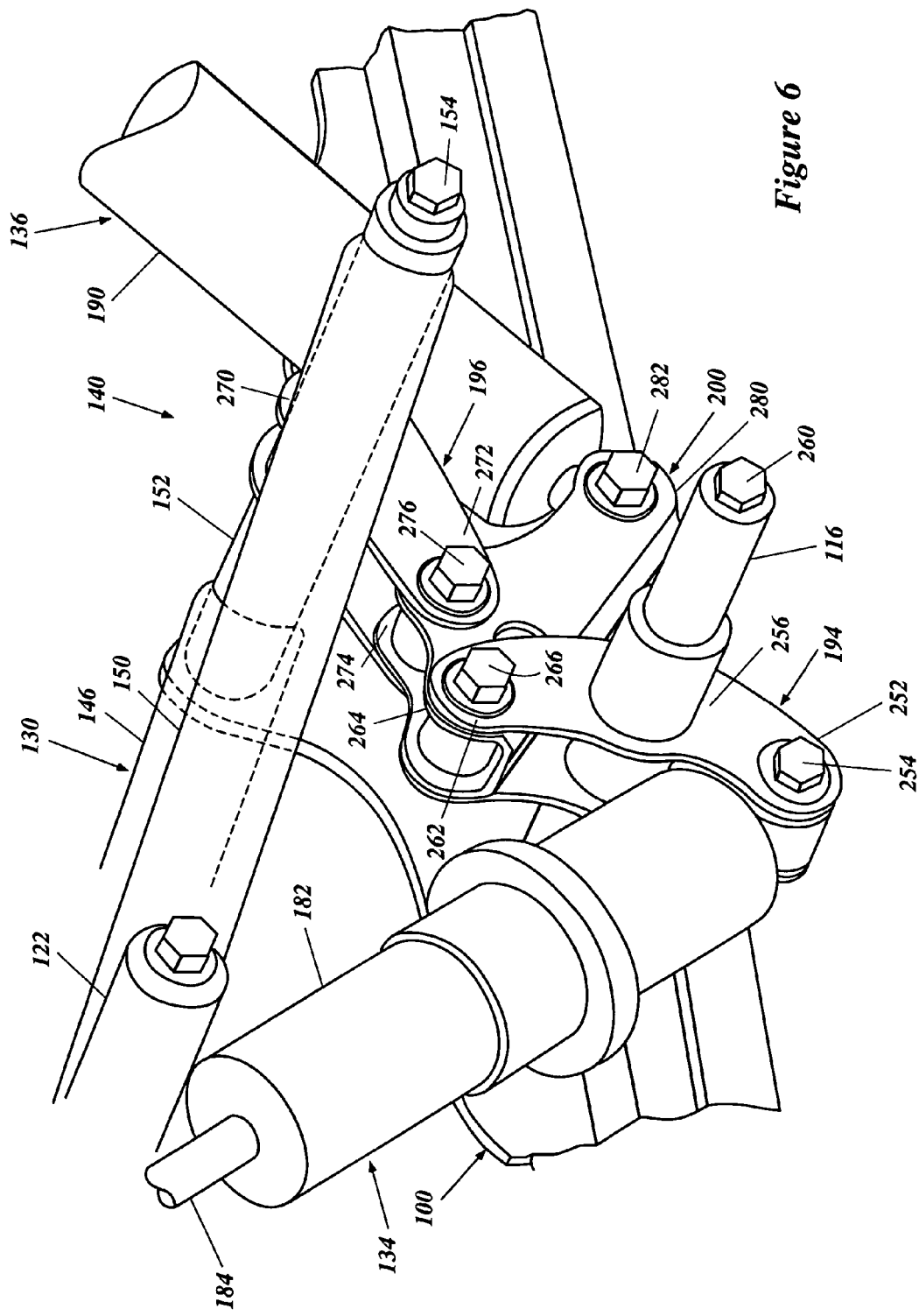
FIG. 6 is a perspective view of a linkage mechanism of the suspension system of FIG. 3.
Figure 7:
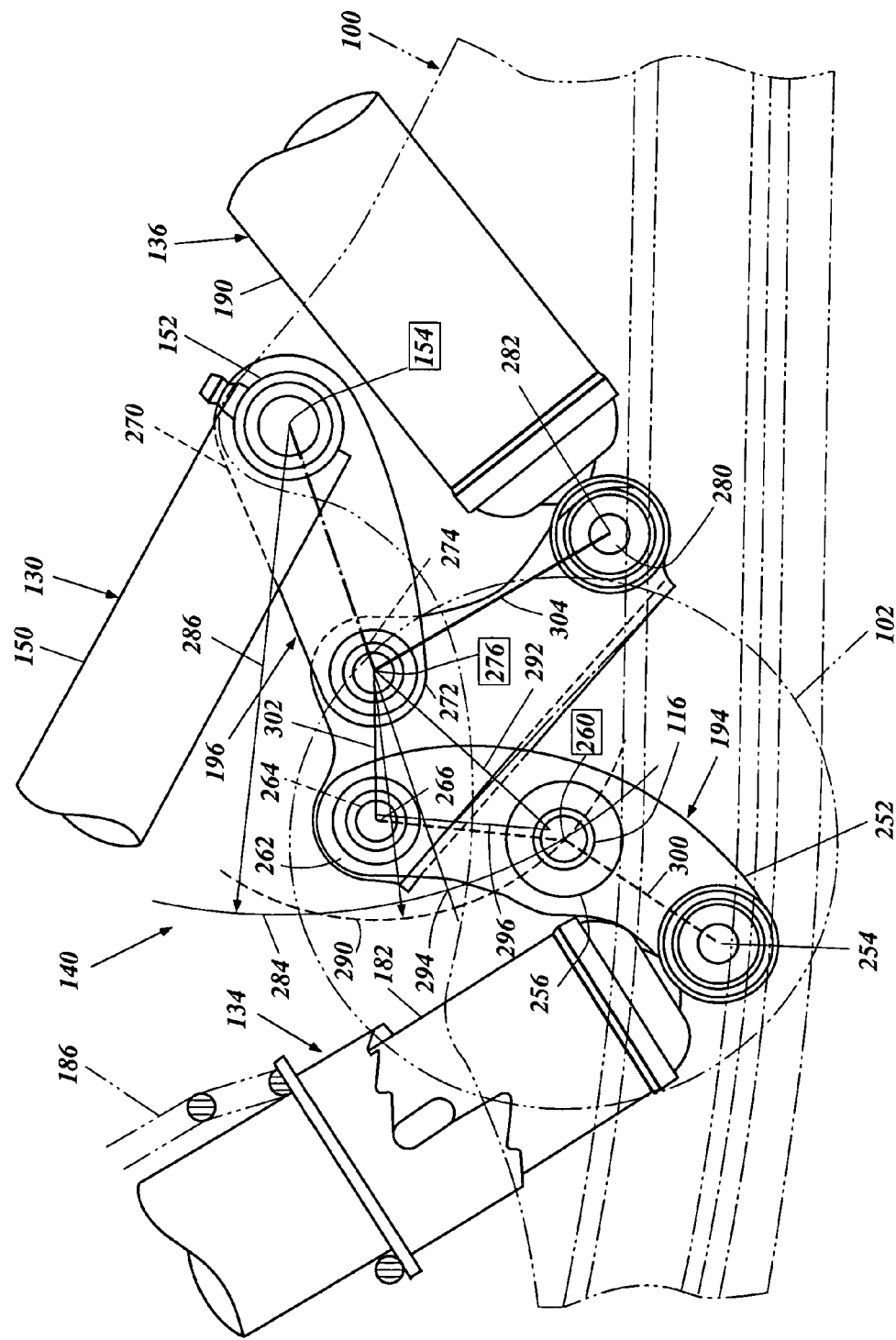
FIG. 7 is a side elevational view of the linkage mechanism of FIG. 6.

With reference to FIGS. 6 and 7, in one embodiment a linkage mechanism 140 comprises a first linkage member 194, a second linkage member 196, and a third linkage member 200. The first linkage member 194 is pivotally coupled to the lower end of the front shock absorber 134 and the intermediate cross shaft 116 of the slide rail assembly 100. The second linkage member 196 is fixed to the lower arm shaft 152 of the front suspension arm 130. The third linkage member 200 is pivotally coupled to the first linkage member 194, to the second linkage member 196, and to the lower end of the rear shock absorber 136. The linkage mechanism 140 is described in more detail below.

As shown in FIGS. 2-4, spring members are located between the body frame 54 and the slide rail assembly 100. The spring members preferably are torsion springs 142. The spring members can also be plate springs. The torsion springs 142 urge the slide rail assembly 100 away from the body frame 54. Each of the torsion springs 142 preferably has a coiled portion 202, a long end portion 204 extending forward from the coiled portion 202, and a short end portion 206 extending rearward from the coiled portion 202. In the illustrated embodiment, the coiled portion 202 of the torsion spring 142 is disposed around the sleeve 166 of the rear sliding arm 132. The short end portion 206 of the torsion spring 142 is supported from below by a bracket 210 secured to a lower side of the rear sliding arm 132.

Figure 8:
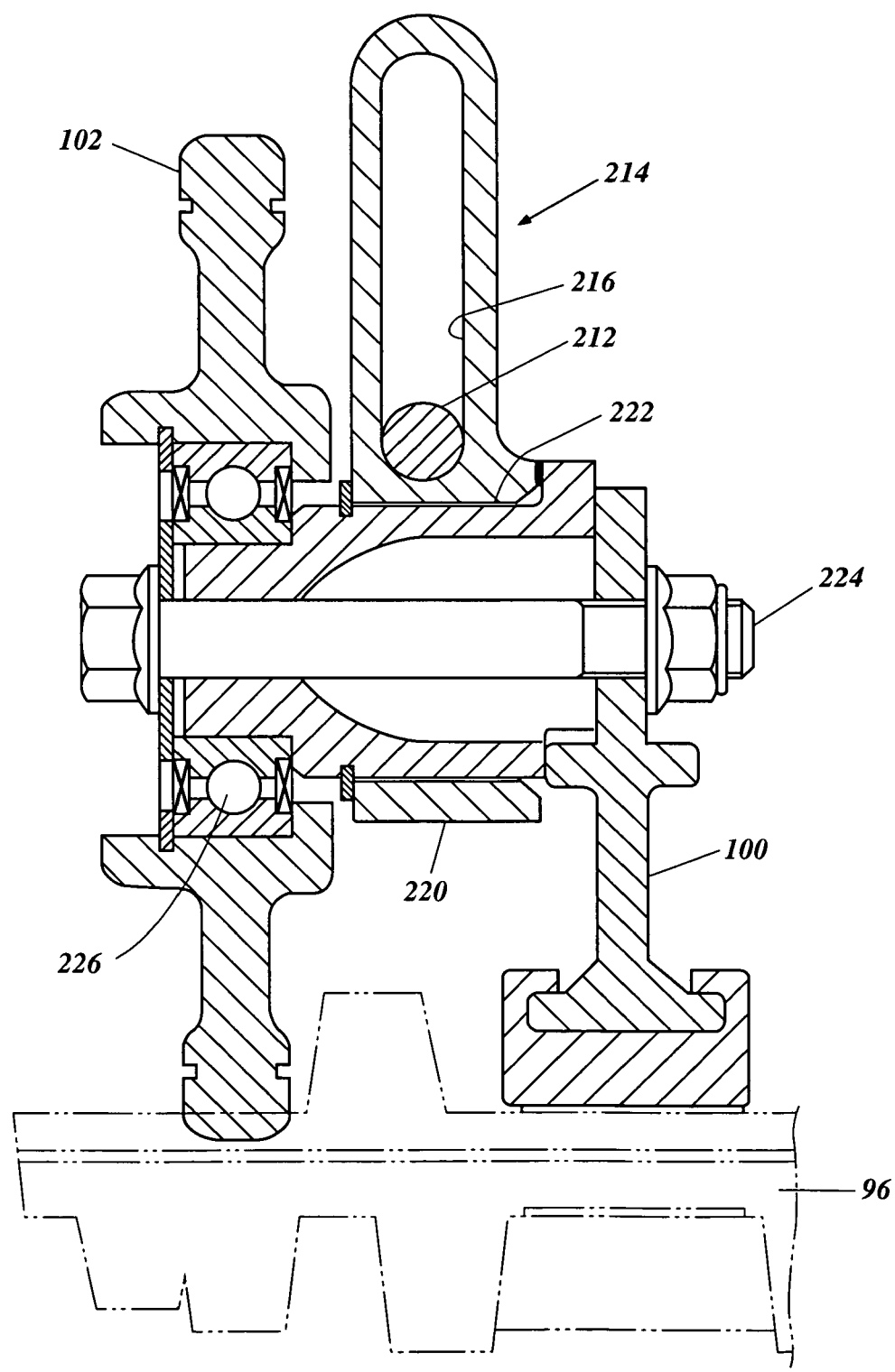
FIG. 8 is a sectional front view of a spring support bracket of the suspension system of FIG. 3.

The long end portion 204 of the torsion spring 142 has an end 212 supported by a spring support bracket 214 attached to the slide rail assembly 100 at a first spring support location 218. As shown in FIG. 8, the spring support bracket 214 in the illustrated embodiment has an ellipsoid shaped support hole 216 having a major axis extending vertically. A lower portion 220 of the spring support bracket 214 is secured to, and supported by, a support shaft 222 of one of the guide wheels 102. The support shaft 222 is secured to the slide rail assembly 100 with a bolt 224. The support shaft 222 rotatably supports the lower guide wheel 102 via bearings 226. The end 212 of the long end portion 204 of the torsion spring 142 is supported by the bottom surface of the support hole 216 with the suspension system in an undeflected state. The end 212 of the long end portion 204 of the torsion spring 142 is movable vertically within the support hole 216.

Figure 9A:
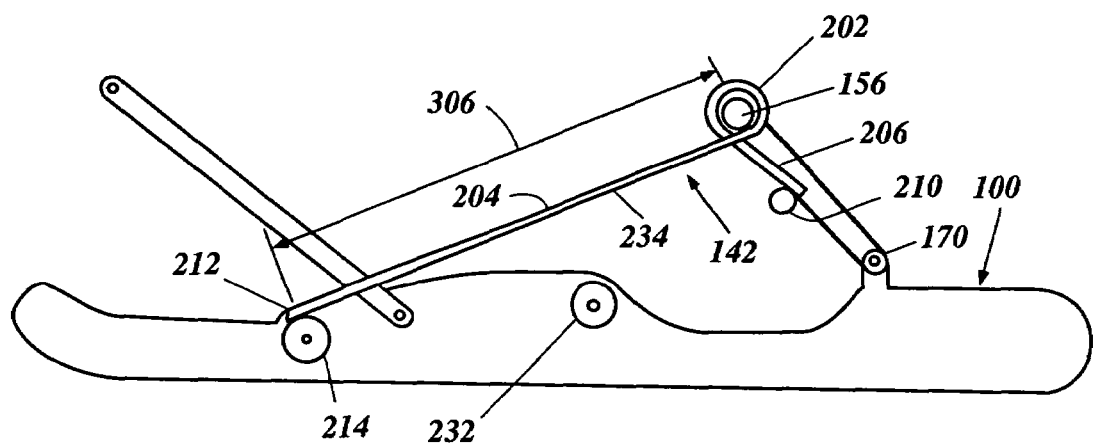
FIGS. 9(*a*), 9(*b*), and 9(*c*) are schematic side views of a torsion spring of the suspension system of FIG. 3.
Figure 9B:
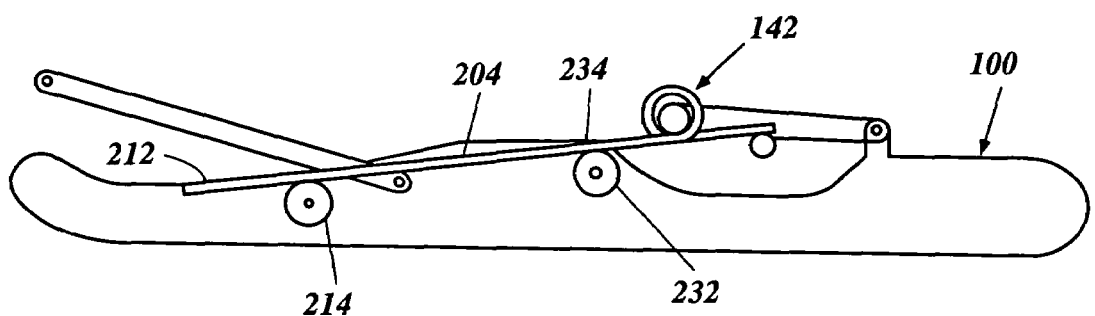
Figure 9C:
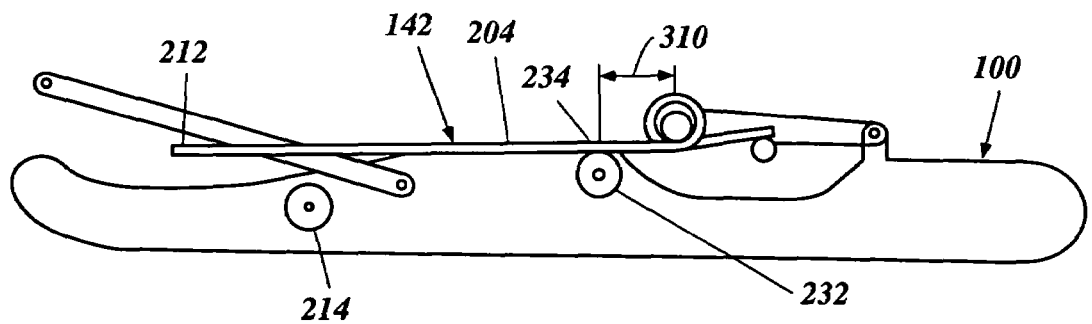

With reference to FIG. 3, each of the right and left side rails 110, 112 in the illustrated embodiment has three openings 230 defined at longitudinally spaced locations. Each opening is located in a position higher than the one located rearward of it. A bobbin-shaped spring support member 232 comprises a circular rod and flanges provided at both ends of the rod. The spring support member 232 can be removably coupled with the slide rail assembly 100. As shown in FIG. 3, the spring support member 232 is coupled with the slide rail assembly 100 at the center opening 230 defined in the slide rail assembly 100. The spring support member 232 is configured to abut the long end portion 204 of the torsion spring 142 at an intermediate spring support location 234 when the slide rail assembly 100 is deflected beyond a prescribed amount. When the snow vehicle 50 passes over a relatively large bump on a snow surface, causing the slide rail assembly 100 to deflect beyond the prescribed amount, the spring support member 232 contacts the long end portion 204 of the torsion spring 142 at the intermediate spring support location 234, as shown in FIG. 9, to change the spring reaction characteristic in a step-like manner as will be described further below.

The spring support member 232 may also be attached in the front or rear opening 230 defined in the slide rail assembly 100 depending upon the user's preference. When the spring support member 232 is located toward the front of the vehicle 50, the variation in spring reaction characteristic is relatively lesser. When the spring support member 232 is located toward the rear of the vehicle 50, the variation in spring reaction characteristic is relatively greater. The spring support member 232 is located in a relatively higher position when the spring support member 232 is coupled to the slide rail assembly 100 at an opening 230 more toward the front of the vehicle 50. Accordingly, the spring support member 232 will contact the long end portion 204 of the torsion spring 142 relatively sooner during a deflection of the slide rail assembly 100. The spring support member 232 is located in a relatively lower position when the spring support member 232 is coupled to the slide rail assembly 100 at an opening 220 more toward the rear of the vehicle 50. The spring support member 232 preferably is located closer to the rear frame coupling location 156. Accordingly, the spring support member 232 will contact the long end portion 204 of the torsion spring 142 relatively later during a deflection of the slide rail assembly 100 and the lever arm of the long end portion will be relatively shorter. The spring members will be described further below.

When the snow vehicle travels over an uneven snow surface causing the slide rail assembly 100 to deflect upward, the slide rail assembly 100 pivots about the front frame coupling location 144, where the front suspension arm 130 is coupled with the body frame 54, and the rear frame coupling location 156, where the rear sliding arm 132 is coupled to the body frame 54. As the vehicle 50 travels, the front and rear shock absorbers 134, 136, and the rear sliding arm 132, extend or contract with the deflection of the slide rail assembly 100. The spring reaction forces and damping forces generated by the extension and contraction of the shock absorbers and rear sliding arm reduce impact forces and absorb vehicle vibrations.

Operation of the Rear Sliding Arm

With reference to FIG. 5, as described above, each of the rear sliding arm members 160, 162 comprises the cylindrical member 172 and the cylindrical sliding shaft 174. The cylindrical member 172 and the cylindrical sliding shaft 174 move relative each other as the slide rail assembly 100 is deflected. The deflection of the slide rail assembly 100 causes the arm length 176 of the rear sliding arm 132 to vary.

The upper ends of the cylindrical members 172 are secured to the rear arm sleeve 166 that is rotatably coupled to the first wheel shaft 124 at the rear frame coupling location 156. The lower ends of the cylindrical sliding shafts 174 are pivotally coupled to the rear cross shaft 120 that extends between the left and right side rails 110, 112. A bushing 236 is coupled to the inside surface of each cylindrical member 172. A pair of front and rear bushes 240, 242 are coupled to the inside surface of the bushing 236 in sliding contact with the outside surface of the sliding shaft 174.

A plurality of shims 244 are attached to the upper end of the sliding shaft 174 in sliding contact with the inside surface of the cylindrical member 172. By increasing or decreasing the number of shims 244, the maximum value of the length 176 of the rear sliding arm 132 can be adjusted. An adjusting nut 246 and a lock nut 250 are threaded on a lower part of the sliding shaft 174. By rotating the nuts 246, 250 the minimum value of the length 176 of the rear sliding arm 132 can be adjusted.

The arm length 176 of the rear sliding arm 132 can change depending on the deflection of the slide rail assembly 100.

The rear sliding arm 132 contracts more as the deflection of the rear portion of the slide rail assembly 100 increases. Accordingly, the effective arm length 176 of the rear sliding arm 132 is decreased.

FIG. 14 schematically illustrates the suspension system 62 as the rear portion of the slide rail assembly 100 is deflected from its initial position and the interaction between the rear sliding arm 132 and the rear shock absorber 136. FIG. 14(a) shows a large deflection of the rear portion of the slide rail assembly 100. The rear sliding arm 132 is shown being compressed from its maximum length to its minimum length. As the deflection of the rear portion of the slide rail assembly 100 increases, the compression stroke of the rear shock absorber 136 also increases. The spring reaction of the rear shock absorber 136 exhibits a generally linear characteristic as the rear sliding arm 132 is compressed from its maximum length to its minimum length.

FIG. 14(b) shows a large deflection of the rear portion of the slide rail assembly 100 where the rear sliding arm 132 has already been compressed to its minimum length. As the deflection of the rear portion of the slide rail assembly 100 continues to increase, the compression stroke of the rear shock absorber 136 increases faster than it increased in the configuration illustrated in FIG. 14(a). Accordingly, the spring reaction of the rear shock absorber 136 increases in a generally linear manner as the rear sliding arm 132 is compressed from its maximum length to its minimum length. Further deflection of the slide rail assembly 100, after the rear sliding arm 132 has been compressed to its minimum length causes the spring reaction of the rear shock absorber to increase at a faster rate, and get progressively larger as the deflection of the slide rail assembly 100 increases.

Figure 15:
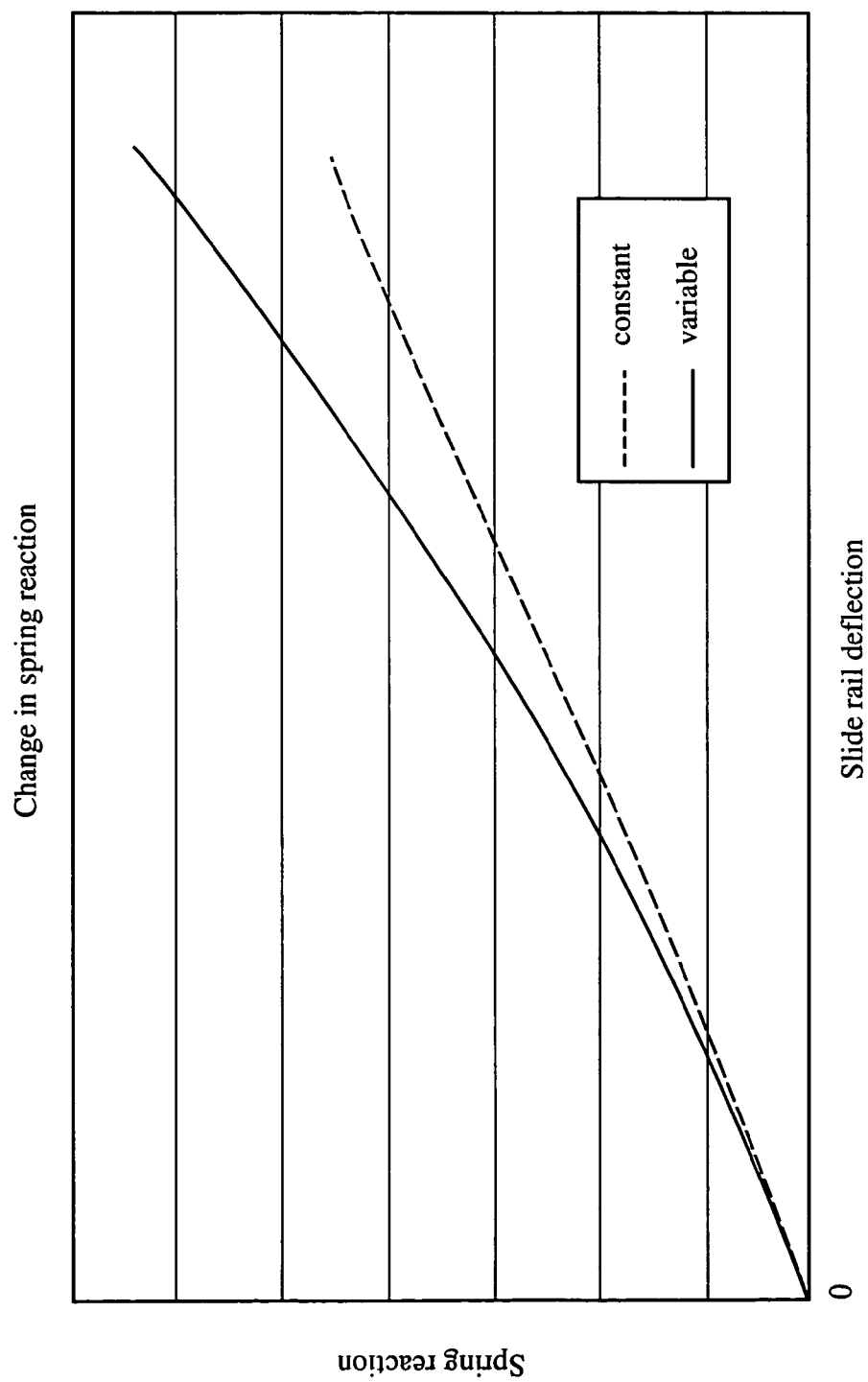
FIG. 15 is a graph of a curve representing the relationship between spring reaction force versus slide rail deflection where the rear sliding arm is provided in the suspension system of FIG. 3.

As shown in FIG. 15, the spring reaction increases in a non-linear manner. The spring reaction associated with the suspension system 62 comprising the rear sliding arm 132 is relatively small during an initial range of deflection of the slide rail assembly 100. During the initial range of deflection of the slide rail assembly 100, the spring reaction increases at a relatively constant rate relative the deflection of the slide rail assembly 100. However, as the deflection of the slide rail assembly 100 increases, the spring reaction begins to increase at a faster rate.

A relatively small spring reaction during an initial range of deflection results in a suspension system 62 that is relatively flexible. A more flexible suspension system 62 can compensate for smaller deflections and provide a comfortable ride. A relatively larger spring reaction during a latter range of deflection results in a suspension system 62 that is relatively stiff. A stiffer suspension system 62 can compensate for larger deflections and inhibit bottoming-out. Bottoming-out, for example, includes reaching the end of the range of travel of the suspension system. Accordingly, the rear sliding arm 132 is configured such that the spring reaction of the suspension system increases at a faster rate as the amount of deflection of the slide rail assembly 100 increases.

A suspension system 62 therefore can have a rear sliding arm 132 configured so that the suspension system 62 exhibits progressively increasing stiffness corresponding to increased deflection of the slide rail assembly 100 to provide a comfortable ride and inhibit bottoming-out. In some cases, the suspension system 62 can exhibit exponentially increasing stiffness. The effective length 176 of the rear sliding arm 132 is decreased as the slide rail assembly 100 is deflected. Accordingly, the shock ratio, which is the shock absorber stroke per unit deflection of the slide rail, is increased and the spring reaction is also increased. As a result, the stiffness of the suspension system 62 increases progressively faster as the deflection of the slide rail assembly 100 increases. Thus, riding comfort is improved and bottoming-out can be inhibited. Additionally, no stopper mechanism is needed. Accordingly, an increase in the number of parts, weight and cost of the vehicle can be avoided. Additionally, the torsional rigidity of the rear arm members about their axes is improved because the rear arm members 160, 162 and the rear shock absorber 136 are coupled with the bracket 164.

Operation of the Linkage Mechanism

As discussed above with reference to FIGS. 6 and 7, the linkage mechanism 140 comprises a first linkage member 194, a second linkage member 196, and a third linkage member 200. In the illustrated embodiment, the first linkage member 194 comprises a pair of right and left plates having an arcuate shape as viewed from a side. A first portion 252 of the first linkage member 194 is pivotally coupled to the lower end of the front shock absorber 134 at a first linkage coupling point 254. The first portion 252 of the first linkage member 194 preferably is a lower end of the first linkage member 194. The lower end of the front shock absorber 134 preferably comprises the cylinder 182 of the front shock absorber 134. A second portion 256 of the first linkage member 194 is pivotally coupled to the slide rail assembly 100 at a second linkage coupling point 260. The first linkage member 194 preferably is pivotally coupled to the slide rail assembly 100 via the intermediate cross shaft 116 extending from the right side rail 110 to the left side rail 112. A third portion 262 of the first linkage member 194 is pivotally coupled to a first portion 264 of the third linkage member 200 at a third linkage coupling point 266.

The second linkage member 196 comprises a pair of right and left plates. The first portion 270 of the second linkage member 196 preferably is fixed to the lower arm shaft 152 of the front suspension arm 130 so as to be pivotally coupled to the slide rail assembly 100 at the front rail coupling location 154. A second portion 272 of the second linkage member 196 is pivotally coupled to a second portion 274 of the third linkage member 200 at a fourth linkage coupling point 276.

The third linkage member 200 comprises a pair of right and left plates having a generally triangular shape as viewed from a side. As stated previously, the third linkage member 200 has a first portion 264 pivotally coupled with the third portion 262 of the first linkage member 194. The second portion 274 of the third linkage member 200 is generally located toward the top of the triangular shape. As mentioned above, the second portion 274 of the third linkage member 200 is pivotally coupled with the second portion 272 of the second linkage member 196. A third portion 280 of the third linkage member 200 is pivotally coupled to the lower end of the rear shock absorber 136 at a fifth linkage coupling point 282. The third portion 280 of the third linkage member 200 preferably is pivotally coupled to the cylinder 190 of the rear shock absorber 136.

The front rail coupling location 154, the second linkage coupling point 260, and the fourth linkage coupling point 276 are arranged such that the distance between the second linkage coupling point 260 and the fourth linkage coupling point 276 changes in a predetermined manner relative to a deflection of the slide rail assembly 100. The front rail coupling location 154, the second linkage coupling point 260, and the fourth linkage coupling point 276 are arranged such that a first arc 284 is defined by a constant radius 286 extending from the front rail coupling location 154 to the second linkage coupling point 260. A second arc 290 is defined by a variable radius 292 extending from the fourth linkage coupling point 276 to the second linkage coupling point 260. The radius 292 of the second arc 290 varies according to the amount of deflection of the slide rail assembly 100. In a plan view the first and second arcs 284, 290 appear in the same plane, and the first arc 284 and second arc 290 overlap due to the deflection of the slide rail assembly 100.

The positional relationship between the front rail coupling location 154, the second linkage coupling point 260, and the fourth linkage coupling point 276 determines the amount that the distance 292 between the second linkage coupling point 260 and the fourth linkage coupling point 276 will change based on an upward deflection of the slide rail assembly 100. The length of the distance 292 between the second linkage coupling point 260 and the fourth linkage coupling point 276 decreases during an initial portion of the deflection range of the slide rail assembly 100 and increases during a latter portion of the deflection range of the slide rail assembly 100. The distance 292 between the second linkage coupling point 260 and the fourth linkage coupling point 276 begins to increase when the deflection of the slide rail assembly 100 has caused the second linkage coupling point 260 to reach a changing point 294.

During the initial portion of the deflection range of the slide rail assembly 100, where the length 292 between the second linkage coupling point 260 and the fourth linkage coupling point 276 is decreased, the operation rates of the front and rear shock absorbers 134, 136 are relatively small compared to the amount of deflection of the slide rail assembly 100. For example, the amount of compression of the shock absorbers 134, 136 is relatively small compared with the amount of deflection of the slide rail assembly 100 during the initial deflection range. Accordingly, the spring reaction of the shock absorbers 134, 136 is relatively small. A relatively small spring reaction during an initial range of deflection results in a suspension system 62 that is relatively flexible. A more flexible suspension system 62 can compensate for smaller deflections and provide a comfortable ride.

In the latter part of the deflection range, where the length 292 between the second linkage coupling point 260 and the fourth linkage coupling point 276 is increased, the operation rates of the front and rear shock absorbers 134, 136 are relatively large compared to the amount of deflection of the slide rail assembly 100. For example, the amount of compression of the shock absorbers 134, 136 is relatively large compared with the amount of deflection of the slide rail in the latter deflection range. Accordingly, the spring reaction of the shock absorbers 134, 136 is relatively large. A relatively larger spring reaction during a latter range of deflection results in a suspension system 62 that is relatively stiff. A stiffer suspension system 62 can compensate for larger deflections and inhibit bottoming-out. Accordingly, the front rail coupling location 154, the second linkage coupling point 260, and the fourth linkage coupling point 276 are configured and arranged such that as the deflection of the slide rail assembly 100 increases, the spring reaction forces of the shock absorbers 134, 136 increase at a faster rate.

The second linkage coupling point 260, the third linkage coupling point 266, and the fourth linkage coupling point 276 are arranged to form a triangle with vertex angles and side lengths such that each stroke of the front and rear shock absorbers 134, 136, and the direction of each stroke, changes in a predetermined manner. In the embodiment shown in FIG. 7, for example, the second linkage coupling point 260, the third linkage coupling point 266, and the fourth linkage coupling point 276 are arranged so that the vertex angles at the second linkage coupling point 260 and the fourth linkage coupling point 276 are always acute. Based on the configuration of the second linkage coupling point 260, the third linkage coupling point 266, and the fourth linkage coupling point 276, the operation rates of the front and rear shock absorbers 134, 136 both decrease when the length 292 between the second linkage coupling point 260 and the fourth linkage coupling point 276 becomes shorter. The operation rates of the front and rear shock absorbers 134, 136 both increase when the length 292 between the second linkage coupling point 260 and the fourth linkage coupling point 276 becomes longer. The second linkage coupling point 260, the third linkage coupling point 266, and the fourth linkage coupling point 276 are arranged such that the vertex angles of the triangle at the second linkage coupling point 260 and at the fourth linkage coupling point 276 are always acute. Accordingly, the second linkage coupling point 260, the third linkage coupling point 266, and the fourth linkage coupling point 276 are configured and arranged such that as the deflection of the slide rail assembly 100 increases, the spring reaction forces of the shock absorbers 134, 136 increase at a faster rate.

Additionally, by properly determining (1) a ratio of the (a) distance 296 between the second linkage coupling point 260 and the third linkage coupling point 266 to (b) the distance 300 between the first linkage coupling point 254 and the second linkage coupling point 260, and (2) a ratio of (a) the distance 302 between the third linkage coupling point 266 and the fourth linkage coupling point 276 to (b) the distance 304 between the fourth linkage coupling point 276 and the fifth linkage coupling point 282, the displacement of the front and rear shock absorbers 134 and 136 can be tailored as desired.

The linkage mechanism 140 preferably can be adjusted so that the shock ratio or lever ratio, which is a ratio of the shock absorber stroke to the deflection of the slide rail, can be adjusted according to the deflection range of the slide rail assembly 100. FIGS. 16-21 relate to front deflection, even deflection, and rear deflection of the slide rail assembly 100. FIGS. 16-21 include charts illustrating shock ratio values of front and rear shock absorbers 134, 136 relative to the slide rail assembly 100 deflections. Each chart includes shock ratio values according to one embodiment of the invention and shock ratio values according to a known vehicle. These values and results are merely exemplary of those obtainable with the illustrated suspension system.

Figure 16:
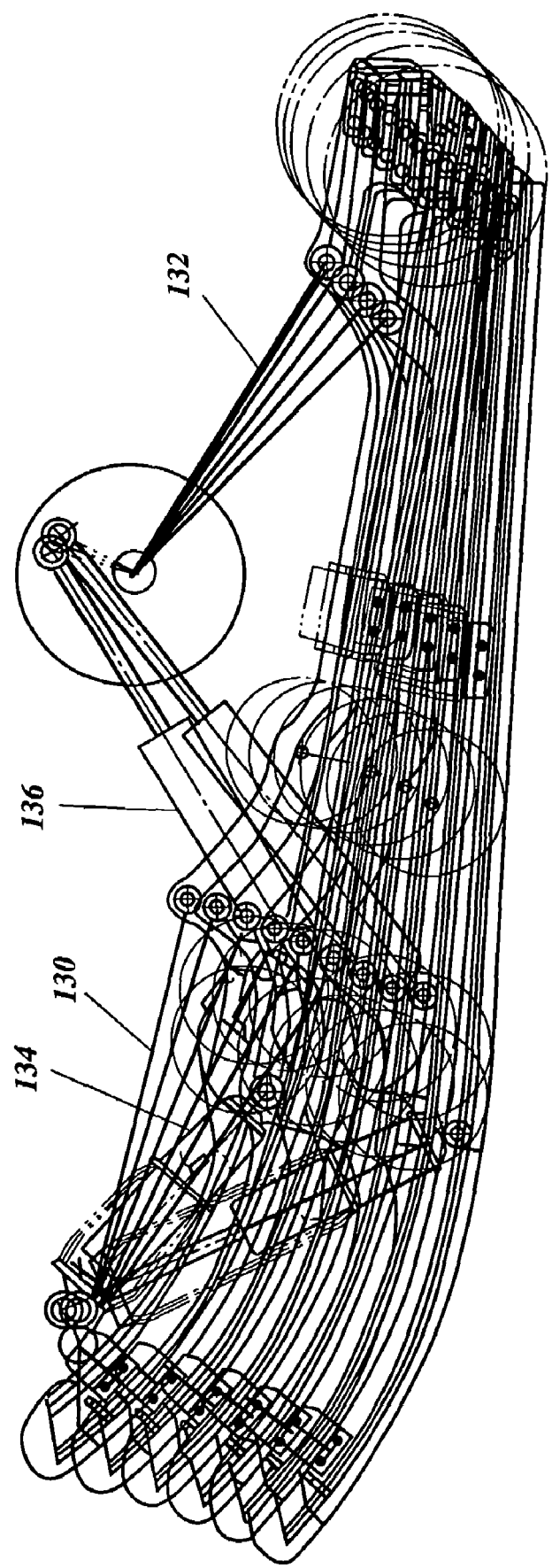
FIG. 16 is a schematic view illustrating the operations of the linkage mechanism of the suspension system of FIG. 3.
Figure 17:
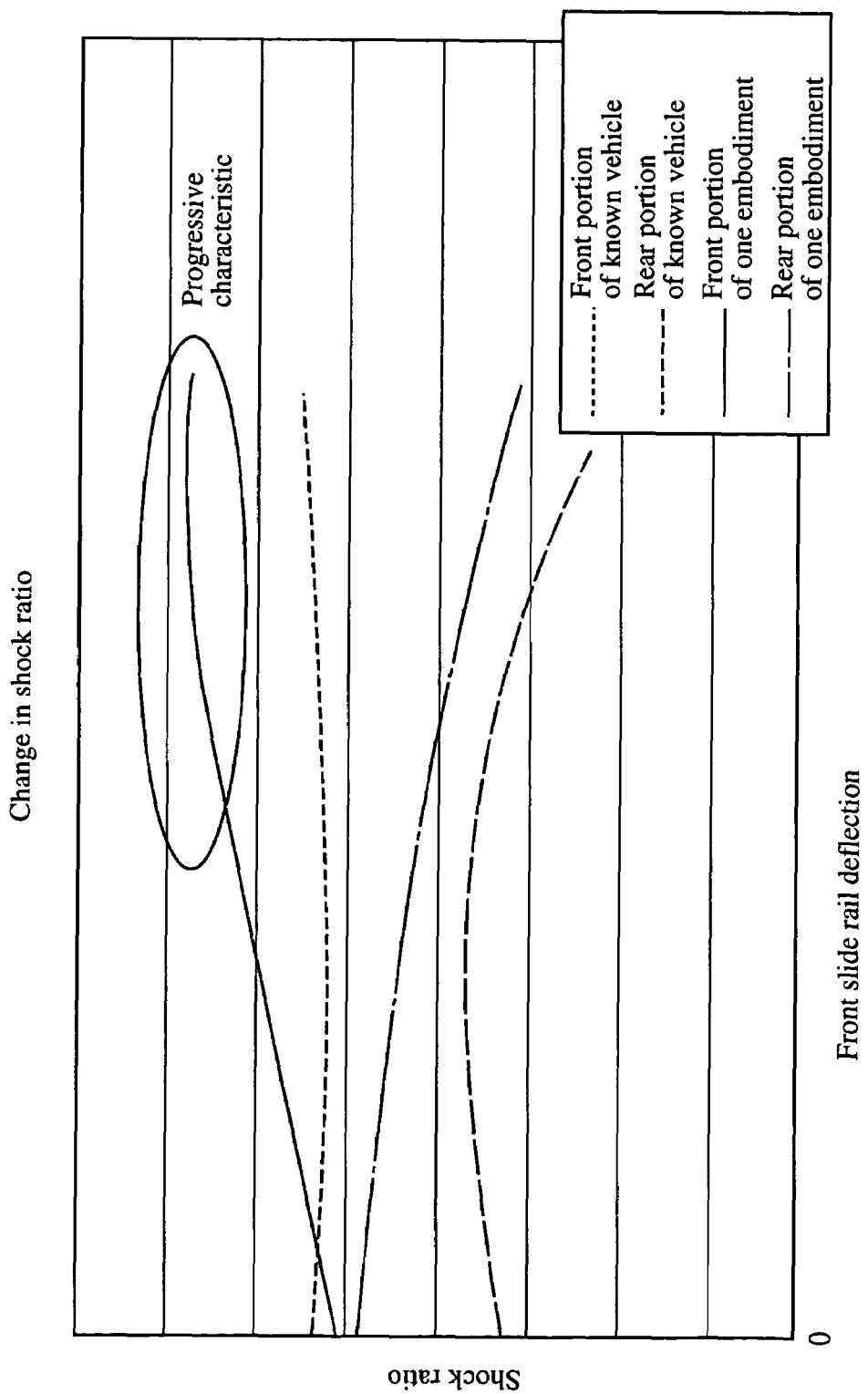
FIG. 17 is a graph of a curve showing the relationship between shock ratio versus slide rail deflection of the suspension system of FIG. 3.

With reference to FIGS. 16 and 17, a force is applied to a front portion of the slide rail assembly 100 causing a large deflection of the front portion of the slide rail assembly 100. The shock ratio of the front shock absorber (i.e., the stroke of the front shock absorber 134 per unit deflection of the front portion of the slide rail assembly 100), according to the embodiment, increases as the deflection of the front portion of the slide rail assembly 100 increases. The shock ratio of a front shock absorber of the known vehicle remains relatively constant as the deflection of the slide rail increases. Additionally, the shock ratio of the rear shock absorber 136 according to the embodiment is relatively higher than the shock ratio of a rear shock absorber of the known vehicle.

The amount of compression of the front shock absorber 134 of the embodiment is relatively large compared with the amount of deflection of the slide rail assembly 100 in the latter deflection range. Accordingly, the spring reaction of the front shock absorber 134 is relatively large. A relatively larger spring reaction during a latter range of deflection and a relatively smaller spring reaction during an initial range of deflection results in a suspension system 62 that gets progressively stiffer with the increased deflection of the slide rail assembly 100. In some cases, the suspension system gets exponentially stiffer with the increased deflection of the slide rail. This provides both a comfortable ride and protection against bottoming-out. In contrast, as seen in FIG. 17, the shock ratio for the front shock absorber of the known vehicle remains relatively constant and does not provide the same level of protection against bottoming-out.

Figure 18:
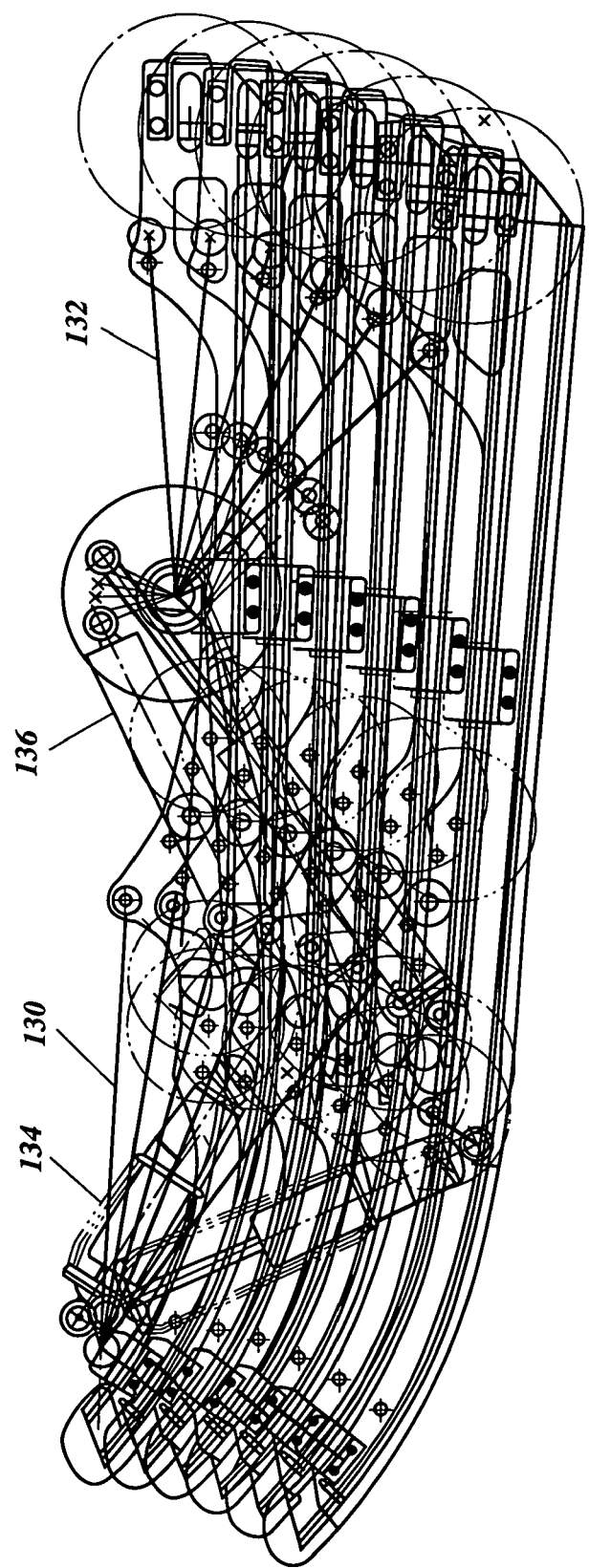
FIG. 18 is a schematic view illustrating the operations of the linkage mechanism of the suspension system of FIG. 3.
Figure 19:
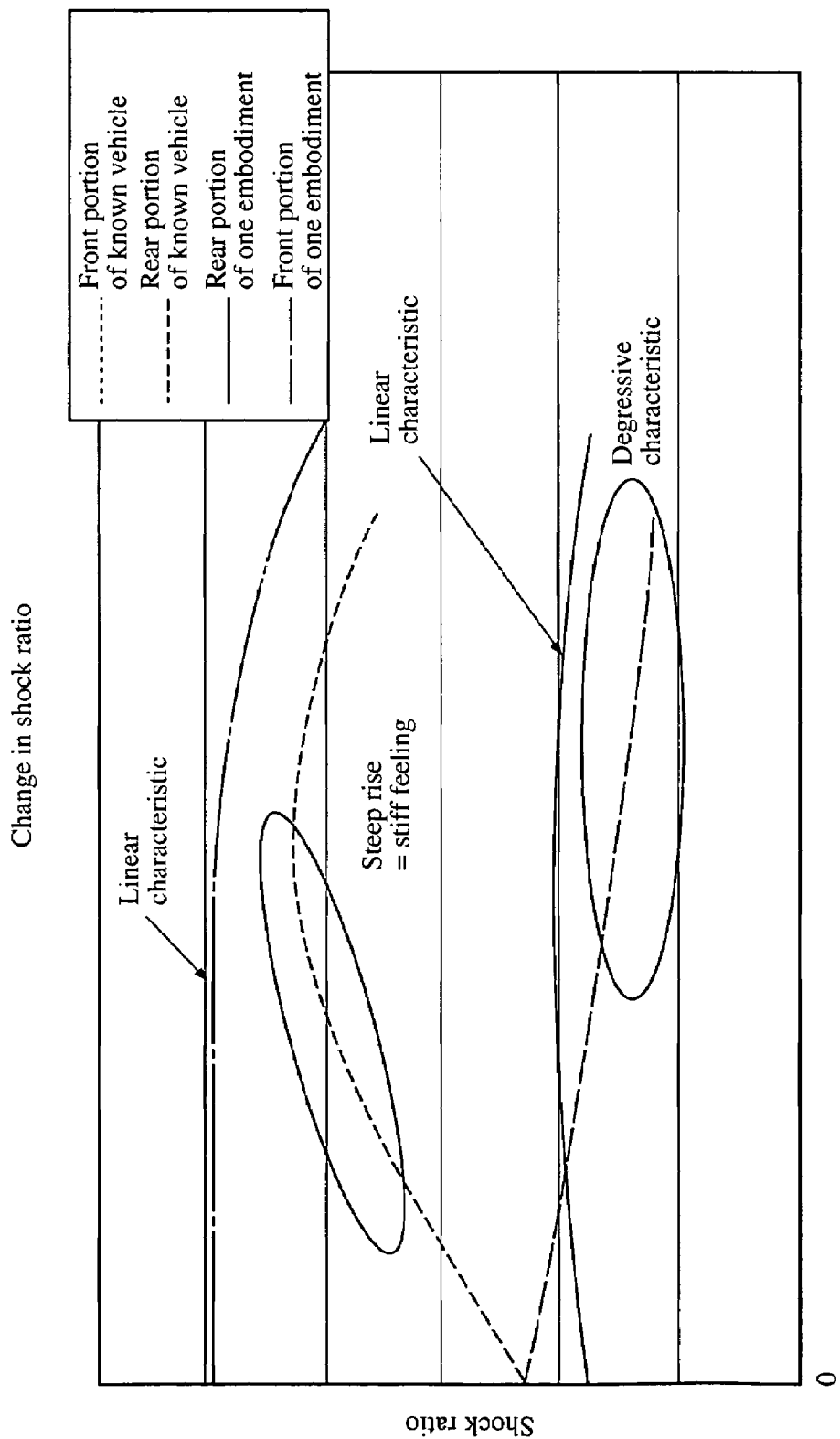
FIG. 19 is a view of a graph showing the relationship between shock ratio versus slide rail deflection of the suspension system of FIG. 3.

FIG. 18 shows a slide rail assembly 100 at different stages of deflection caused by an evenly applied deflection force. FIG. 19 is a graph illustrating the change in shock ratios of the shock absorbers caused by the deflection. With reference to FIG. 18, a force is applied evenly to the entire slide rail assembly 100 and the entire slide rail assembly 100 is deflected. With reference to FIG. 19, the shock ratios of both the front and rear shock absorbers 134, 136 of the embodiment maintain a linear characteristic and remain relatively constant as the amount of deflection of the entire slide rail assembly 100 increases. This response produces a comfortable ride. The shock ratio of the front shock absorber of the known vehicle increases significantly during the initial deflection period of the slide rail assembly 100. This causes the suspension to be relatively stiff, even when the amount of deflection of the slide rail is relatively small, producing an uncomfortable ride. The shock ratio of the rear shock absorber of the known vehicle decreases as the deflection of the slide rail increases.

Figure 20:
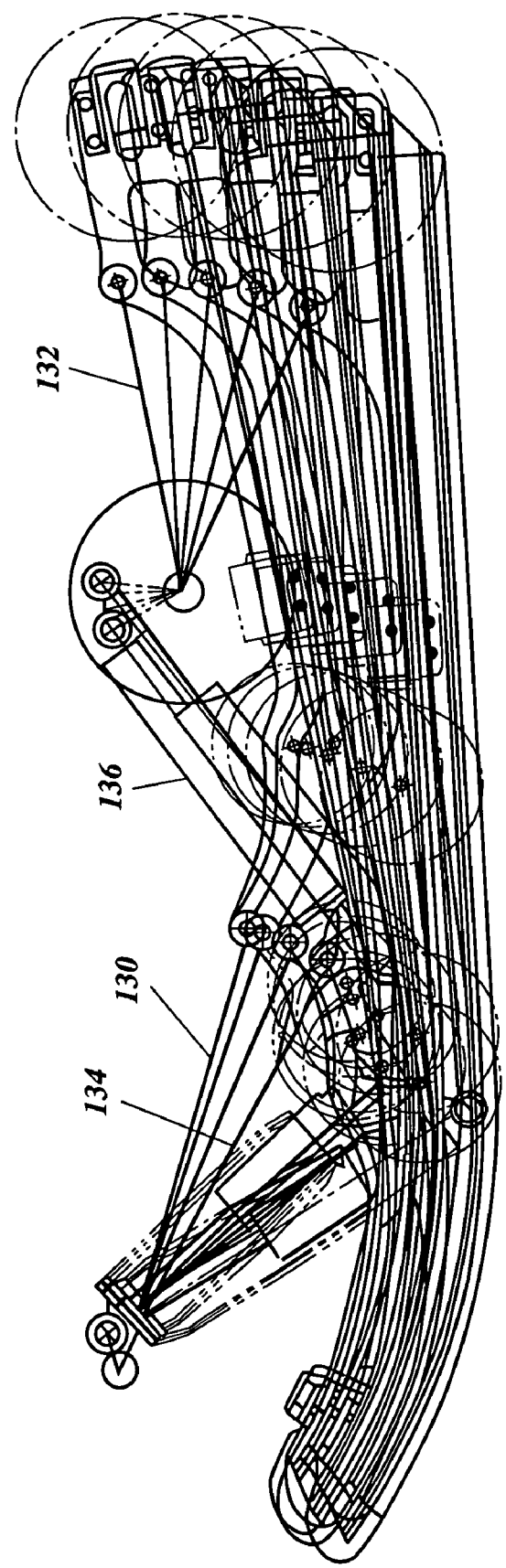
FIG. 20 is a schematic view illustrating the operations of the linkage mechanism of the suspension system of FIG. 3.
Figure 21:
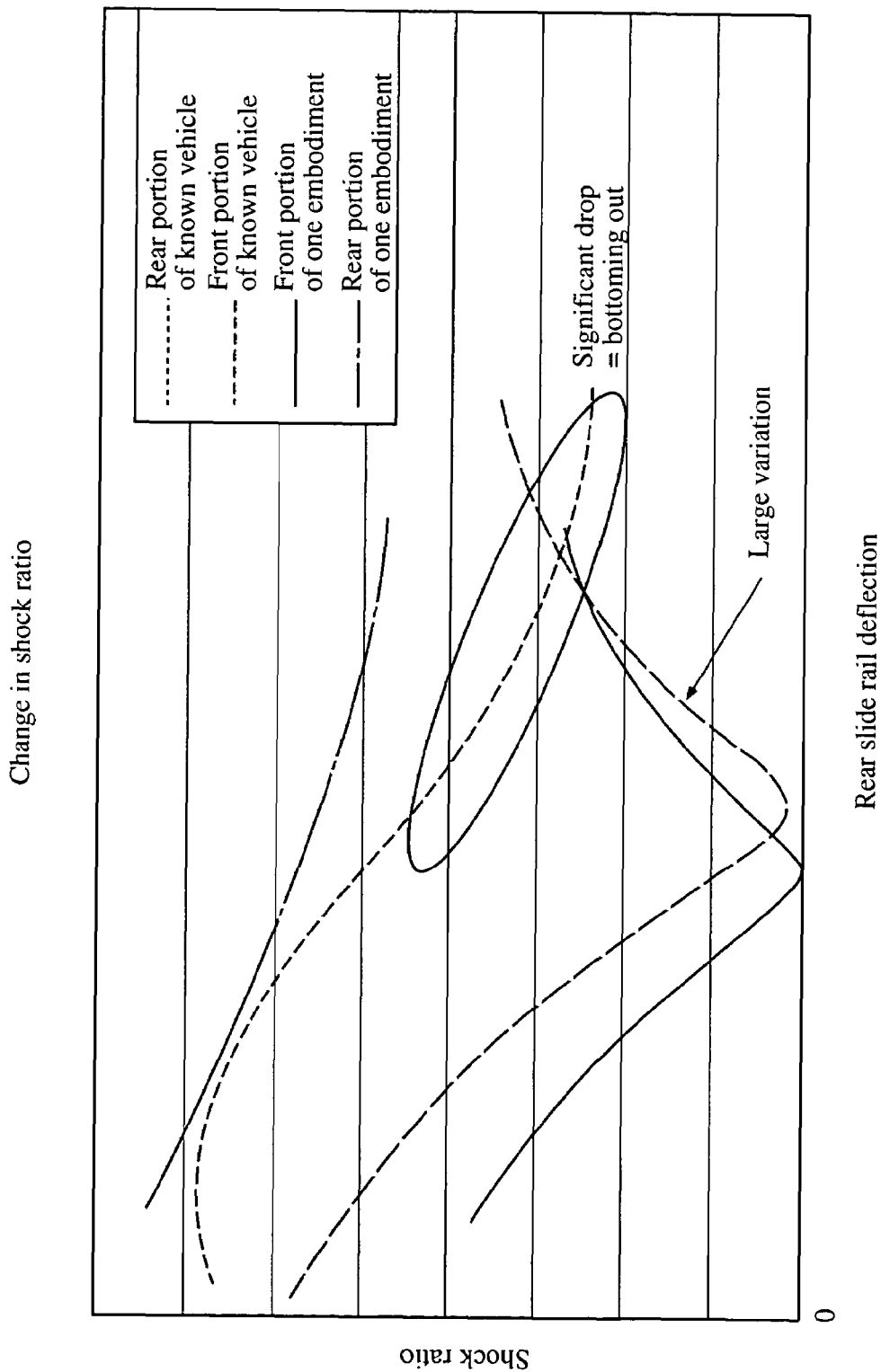
FIG. 21 is a graph of a curve showing the relationship between shock ratio versus slide rail deflection of the suspension system of FIG. 3.

FIG. 20 shows a slide rail assembly 100 at different stages of deflection caused by a force applied to a rear portion of the slide rail assembly 100. FIG. 21 is a graph illustrating the change in shock ratios of the shock absorbers caused by the deflection. With reference to FIG. 20, a force is applied to a rear portion of the slide rail assembly 100 causing a large deflection of the rear portion of the slide rail assembly 100. With reference to FIG. 21, the shock ratio of the rear shock absorber 136 of the embodiment decreases only moderately as the deflection of the rear portion of the slide rail assembly 100 increases. The shock ratio of the rear shock absorber of the known vehicle decreases significantly as the deflection of the rear portion of the slide rail increases. The significant decrease in the shock ratio of the rear shock absorber of the known vehicle increases the likelihood that the vehicle will bottom-out. The moderate decrease of the shock ratio of the rear shock absorber 136 of the embodiment is less likely to bottom-out. Additionally, the range of variation in the shock ratio of the front shock absorber 134 of the embodiment is decreased compared with the shock ratio of the front shock absorber of the known vehicle, providing a more comfortable ride.

Accordingly, a suspension system 62 can have a linkage mechanism 140 coupling a shock absorber 134, 136 to the slide rail assembly 100 so that the shock ratio is suitable for the deflection range of the slide rail assembly 100, and so that the suspension system 62 exhibits stiffness that increases in a non-linear manner corresponding to increased deflection of the slide rail assembly 100 to provide a comfortable ride and inhibit bottoming-out. When the slide rail assembly 100 is deflected, in the initial part of the deflection range, the compression rates of the front and rear shock absorbers 134, 136 (the compression of the shock absorbers 134, 136 per unit deflection of the slide rail assembly 100) is small. Thus, the spring reaction is small enough to provide a comfortable ride. In the latter part of the deflection range, the compression rates of the front and rear shock absorbers 134, 136 are large and the spring reaction is large. Accordingly as the deflection of the slide rail assembly 100 increases, the stiffness of the suspension system 62 increases progressively faster. Additionally, the compression rates of the front and rear shock absorbers 134, 136 exhibit similar tendencies relative to the change in the length 292 between the second linkage coupling point 260 and the fourth linkage coupling point 276. For example, the operation rates of the front and rear shock absorbers 134, 136 both become smaller when the length 292 becomes shorter, and become larger when the length 292 becomes longer. Thus, the front and rear spring reaction characteristics exhibit similar tendencies.

Operation of the Spring Members and Spring Supports

As described above, torsion springs 142 are located between the body frame 54 and the slide rail assembly 100 to urge the slide rail assembly 100 away from the body frame 54. As the vehicle 50 travels and the slide rail assembly 100 is deflected upward, the torsion springs 142 are elastically deformed to absorb the shock. As shown in FIGS. 9(a), 9(b), 9(c) and 10, when the deflection of the slide rail assembly 100 is within an initial range, which is not greater than a predetermined amount, the torsion springs 142 are elastically deformed with the ends 212 of the long end portions 204 being supported on the spring support brackets 214. Thus, the spring reaction of the torsion spring 142 corresponds to curve A shown in FIG. 10, where the spring reaction is related to the length 306 of the long end portion 204 of the torsion spring 142. The spring reaction is relatively small during an initial range of deflection. This results in a suspension system 62 that is relatively flexible. A more flexible suspension system 62 can compensate for smaller deflections and provide a comfortable ride.

Figure 10:
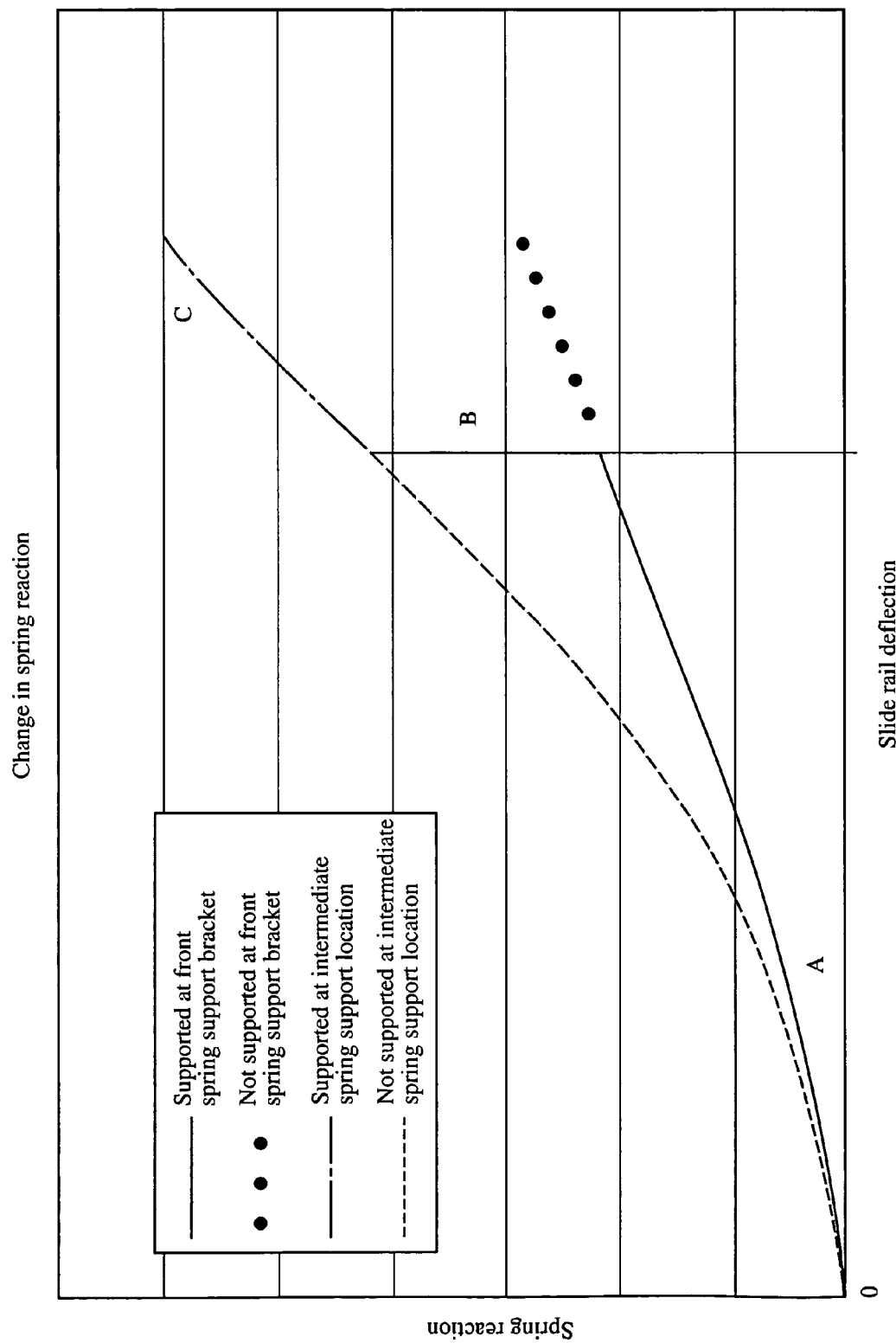
FIG. 10 is a graph of a curve representing the relationship between a spring reaction force versus an amount of slide rail deflection of the suspension system of FIG. 3.

When the upward deflection of the slide rail assembly 100 reaches the prescribed amount, the spring support members 232 contact the long end portions 204 of the torsion springs 142 at the intermediate spring support locations 234. As the torsion springs 142 contact the spring support members 232, the spring reactions sharply increase in a step-like fashion, as shown in FIG. 10 by curve B.

When the upward deflection of the slide rail assembly 100 increases beyond the prescribed amount, the long end portions 204 of the torsion springs 142 are elastically deformed by the spring support members 232. Thus, the spring reaction of the torsion spring 142 corresponds to curve C shown in FIG. 10, where the spring reaction is related to the length 310 of the short spring section between the rear frame coupling location 156 and the intermediate spring support location 234. The spring reaction increases significantly as the deflection of the slide rail assembly 100 increases. A relatively larger spring reaction during a latter range of deflection results in a suspension system that is relatively stiff. A stiffer suspension system can compensate for larger deflections and inhibit bottoming-out. Accordingly, the torsion spring 142 and the intermediate spring support locations 234 are configured to have a spring reaction that increases significantly as the amount of deflection of the slide rail assembly 100 increases.

Figure 11:
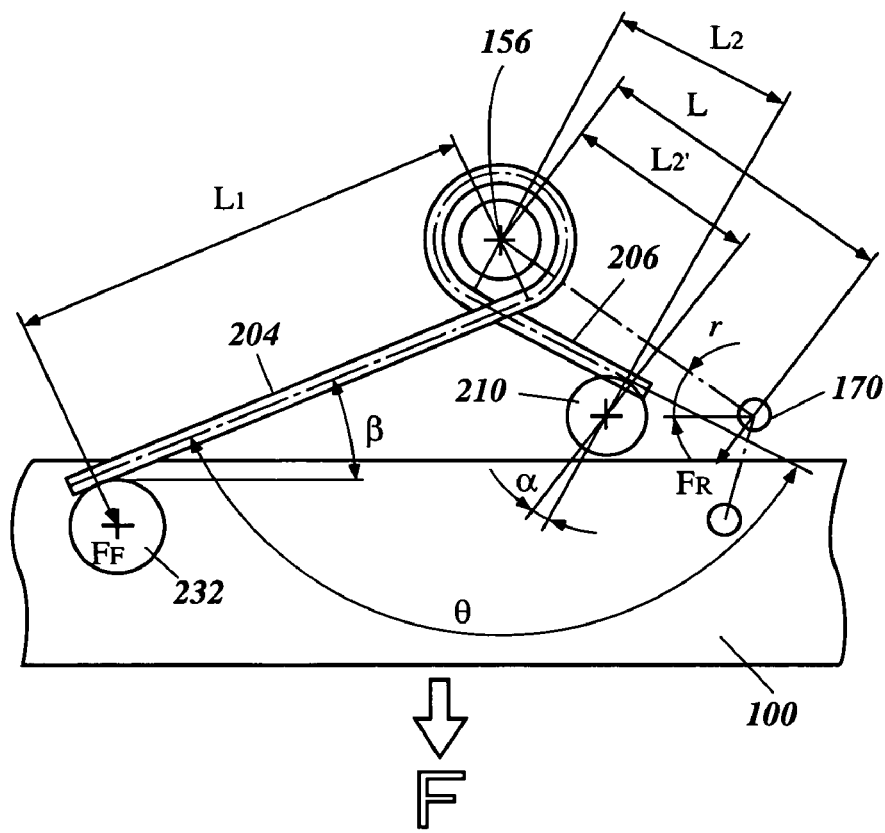
FIG. 11 is a schematic view showing the reaction forces associated with the torsion spring of the suspension system of FIG. 3.

With reference to FIG. 11, L1 is the arm length of the long end portion 204 of the torsion spring 142, L2 is the arm length of the short end portion 206 of the torsion spring 142, and L3 is the length of the rear sliding arm 132. The reaction force F is obtained from the following equation:

$$F = F_F \cos â + F_R \cos ã = k(è - è_0)[(\cos â/L1) + (L2'/L3L2)(\cos â \cdot \cos ã)]$$

With continued reference to FIG. 11, $F_F$ is the force that the long end portion 204 exerts on the spring support member 232 at the intermediate spring support location 234. â is the angle formed by the long end portion 204 and a horizontal line. $F_R$ is the force that the short end portion 206 exerts on the bracket 210 of the rear sliding arm 132. ã is the angle formed by the short end portion 206 and a horizontal line. k is a constant. è is the angle formed by the long end portion 204 and the short end portion 206. It is apparent from the equation that when the arm length L1 of the long end portion 204 is shorter, the spring reaction F is greater.

The openings 230 formed in the slide rail assembly 100 are at longitudinally spaced points so that each of the spring support members 232 can be removably attached in one of the openings 230. Changing the positions of the spring support members 232 on the slide rail assembly 100 will change the spring reaction characteristic. Thus, the user can alter the spring reaction characteristic as desired by adjusting the location where the spring support members 232 are coupled to the slide rail assembly 100. Changing the positions of a pair of spring support members 232 can change the spring reaction characteristic. Additionally, more than one pair of spring support members 232 can be provided. The spring reaction can be adjusted to any one of many levels within a broad range.

Figure 12:
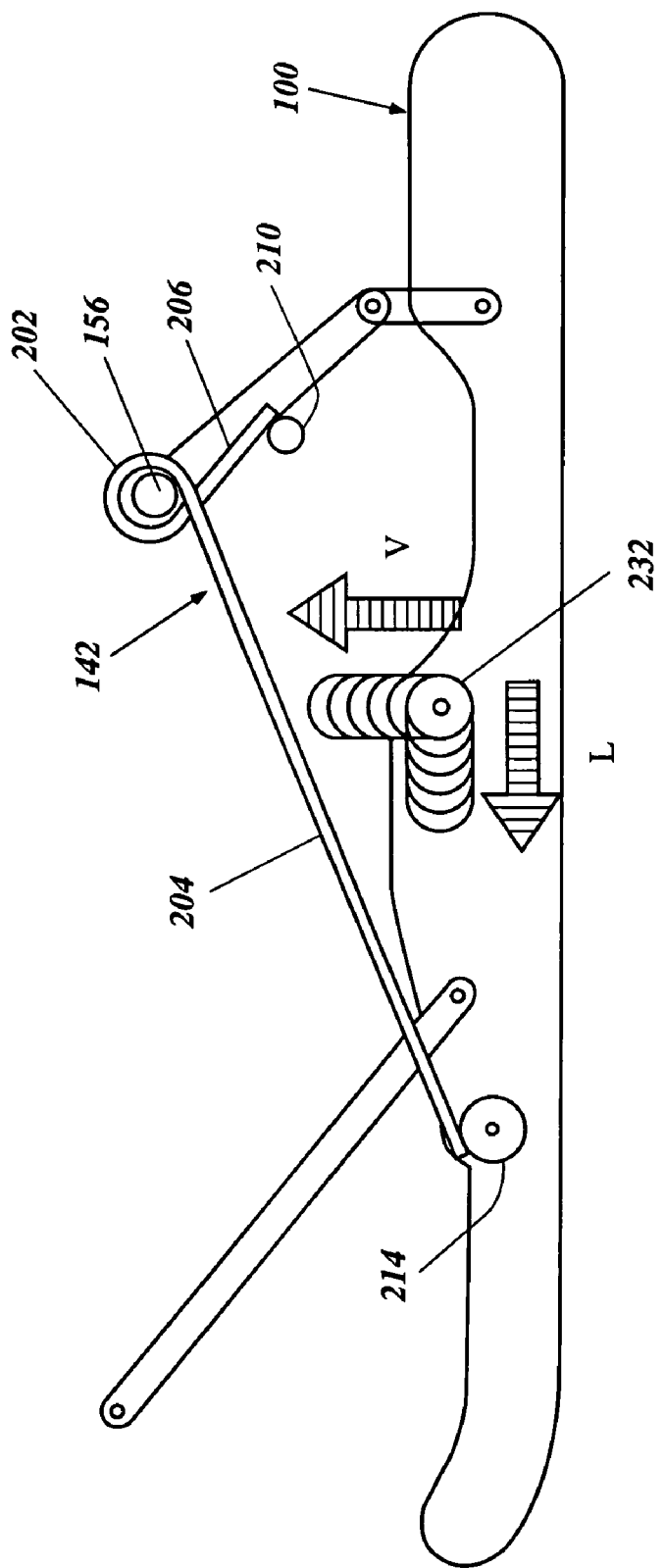
FIG. 12 is a schematic view illustrating a change in position of a spring support member of the suspension system of FIG. 3.
Figure 13:
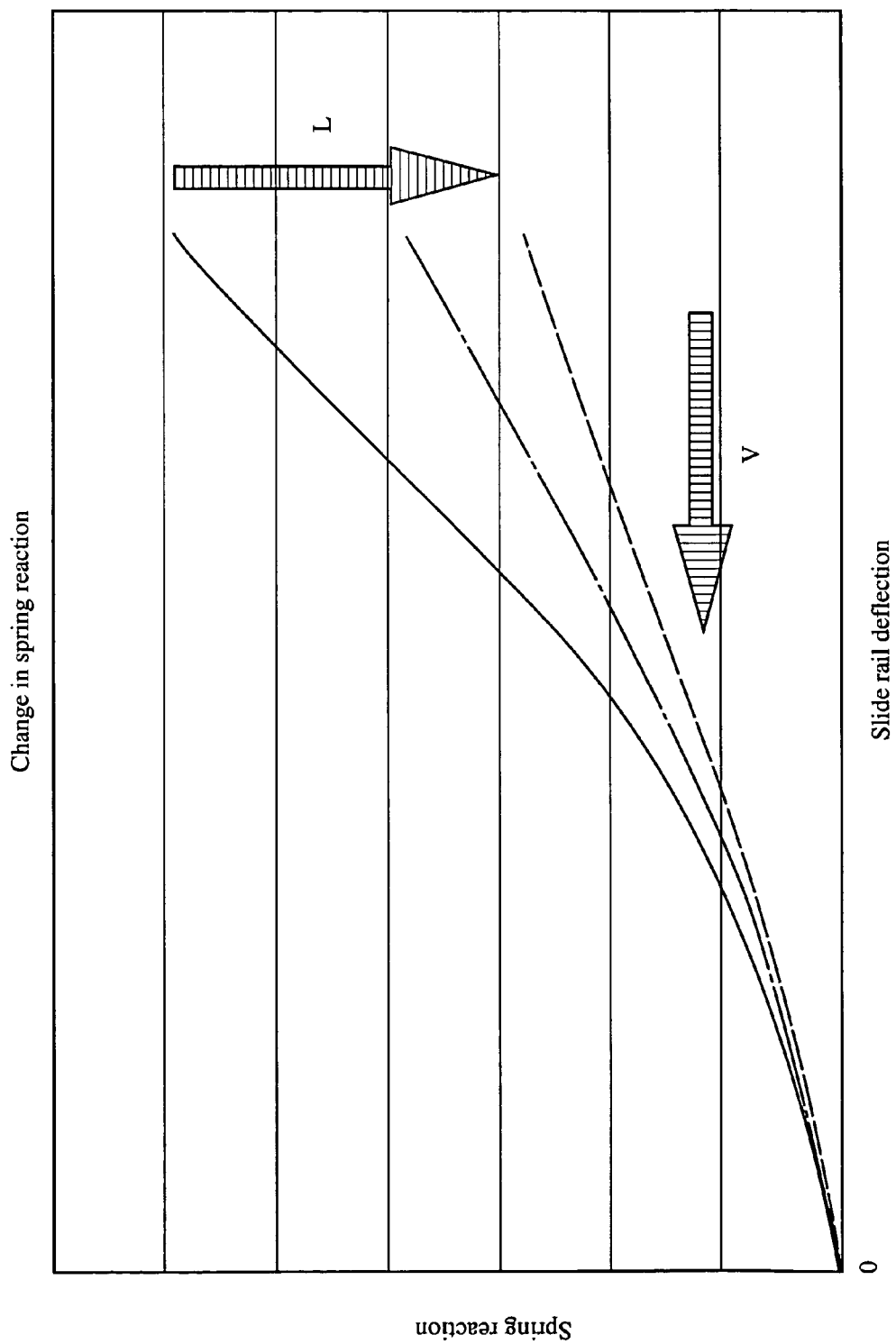
FIG. 13 is a graph of a curve representing the relationship between spring reaction force versus slide rail deflection where the position of the spring support member of FIG. 12 is changed.

The positions of the spring support members 232 are not limited to those described in connection with the illustrated embodiment. The positions of the spring support members 232 in other embodiments can be changed according to the user's preference. As shown in FIGS. 12 and 13, the positions of the spring support members may be adjusted in a vertical direction V, in a longitudinal direction L, or in both the vertical and longitudinal directions V, L. The positions of the spring support members 232 may be adjusted in a continuous manner or in stages.

By adjusting the positions of the spring support members 232 in the vertical direction V, the amount of deflection, which occurs before the spring reaction is changed, can be adjusted. Additionally, adjusting the positions of the spring support members in the longitudinal direction L alters how drastically the spring reaction changes. With reference to FIG. 13, the increase in the spring reaction is more moderate when the spring support members 232 are located higher or closer to the front. The increase in the spring reaction is more abrupt as the spring support members 232 are located lower or closer to the rear.

Therefore, a suspension system can have one or more torsion spring and one or more spring supports configured such that the suspension system has a shock ratio suitable for the deflection range of the slide rail. Consequently, the suspension system can exhibit stiffness that increases in a non-linear manner corresponding to increased deflection of the slide rail to provide a comfortable ride and inhibit bottoming-out. Where the deflection of the slide rail is not greater than a prescribed amount, the suspension system is relatively flexible because the spring reaction increases moderately during the initial deflection range of the slide rail, thus providing a comfortable ride. When the deflection of the slide rail reaches or exceeds the prescribed amount, the suspension system is relatively stiffer because the spring reaction sharply increases when the spring support member contacts the torsion spring. As a result, bottoming-out can be inhibited. In some embodiments, since the position of the spring support member is adjustable relative to the torsion spring, the spring reaction characteristic can be varied depending upon the user's preference within a relatively wide range. Also, in some embodiments, since the operation angle of the spring member is small, the spring stress generated in the spring member is small.

FIGS. 22-25 illustrate another embodiment. The spring reaction characteristic of a torsion spring 142a can be adjusted manually by a user. The spring reaction characteristic can be adjusted to a first level to accommodate a single rider. The spring reaction characteristic can also be adjusted to a second level to accommodate a plurality of riders. Adjustments preferably can be made without a tool. The same reference numerals used in connection with FIGS. 1-21 will be used to designate the same or corresponding parts in FIGS. 22-25, except that the suffix letter "a" is added.

Figure 22:
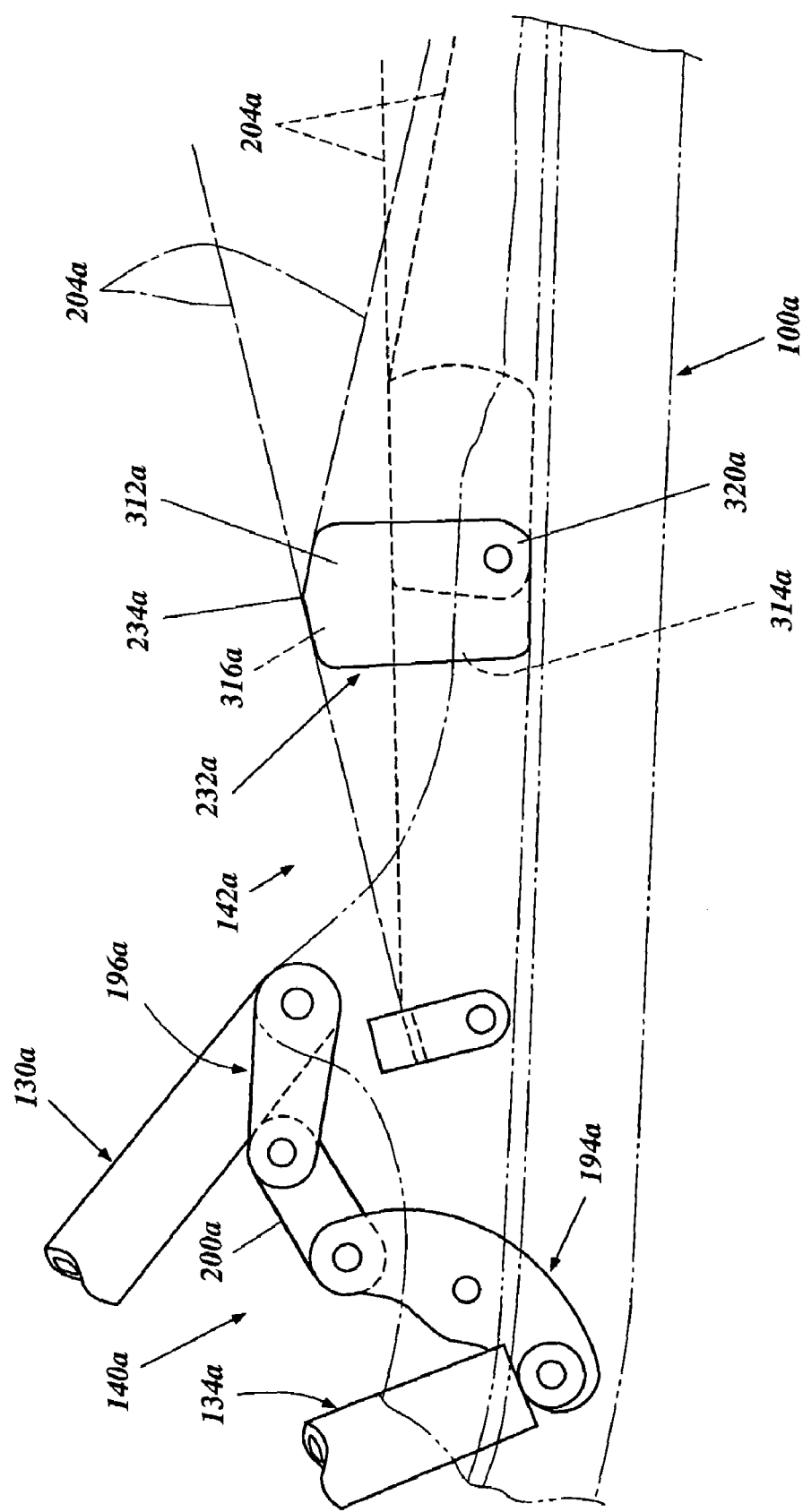
FIG. 22 is a schematic view of a portion of a suspension system according to another embodiment of the present invention.
Figure 23:
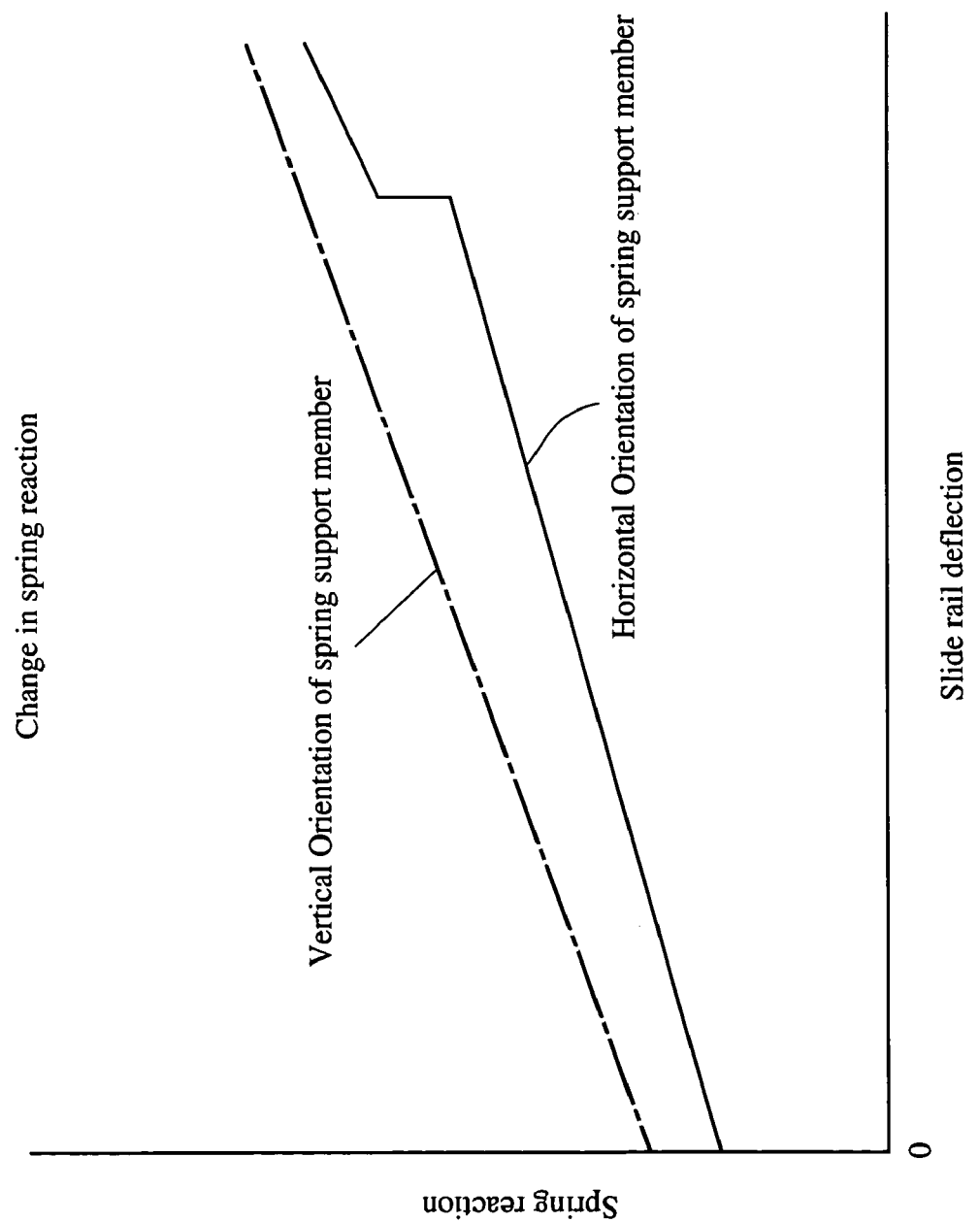
FIG. 23 is a graph of a curve showing the relationship between spring reaction force versus slide rail deflection for the suspension system of FIG. 22.

FIG. 22 shows a spring support member 232a for supporting a long end portion 204a of a torsion spring 142a at intermediate spring support locations 234a. The spring support member 232a is movable between a vertical orientation and a horizontal orientation relative to the slide rail assembly 100a. The spring support member 232a has a spring support block 312a. The spring support block 312a preferably is made of aluminum alloy or other suitable material. The spring support block 312a can have a generally rectangular shape as viewed from a side. The spring support block 312a has a long spring support groove 314a along one long side of the rectangle and a short spring support groove 316a continuing from the long spring support groove 314a along one short side of the rectangle. The long and short spring support grooves 314a, 316a are configured such that when the slide rail assembly 100a is deflected beyond a predetermined amount, the torsion spring 142a contacts at least one point on the surface of the long and short spring support grooves 314a, 316a.

Figure 24:
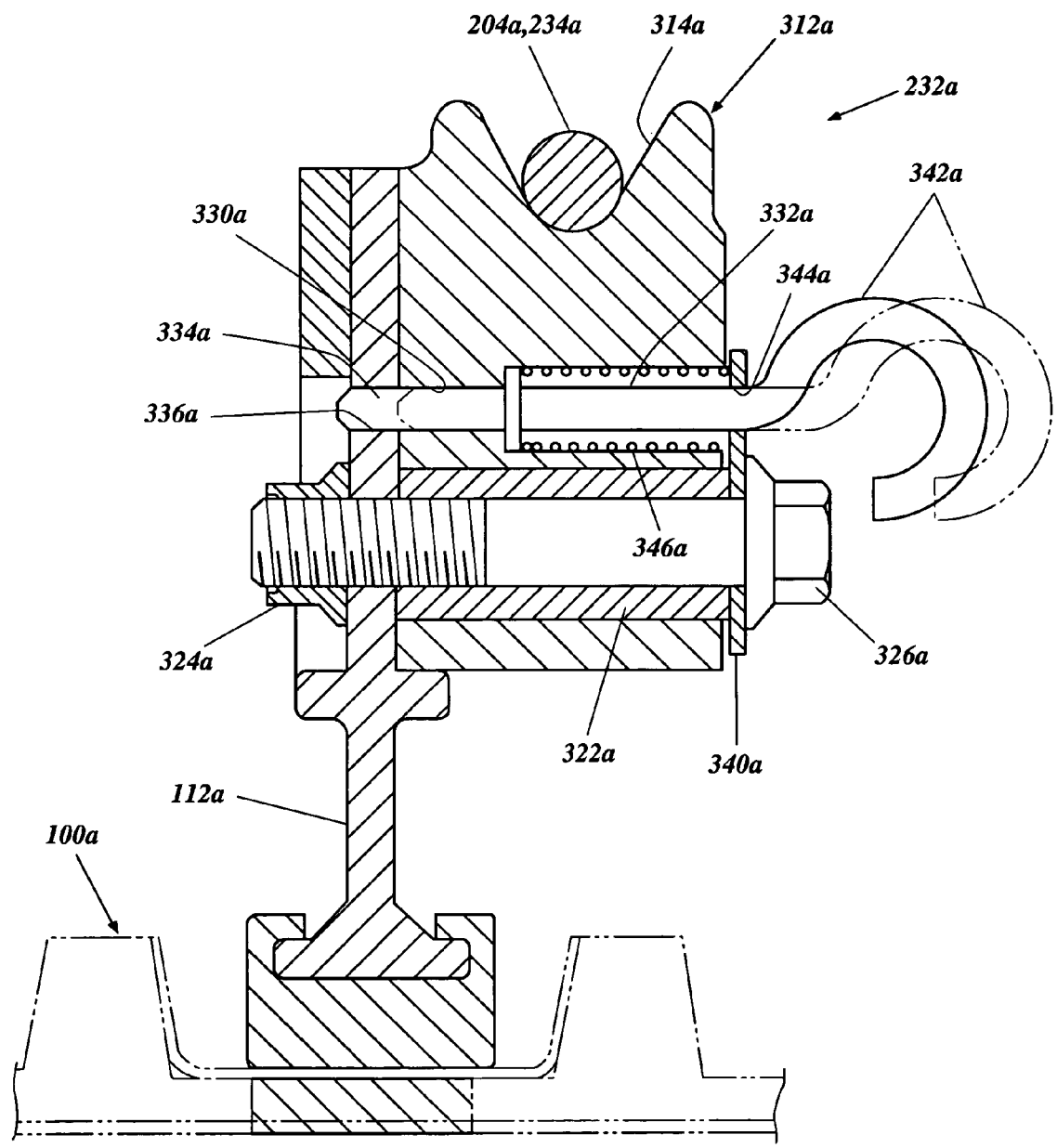
FIG. 24 is a sectional front view of a spring support member of the suspension system shown in FIG. 22.
Figure 25:
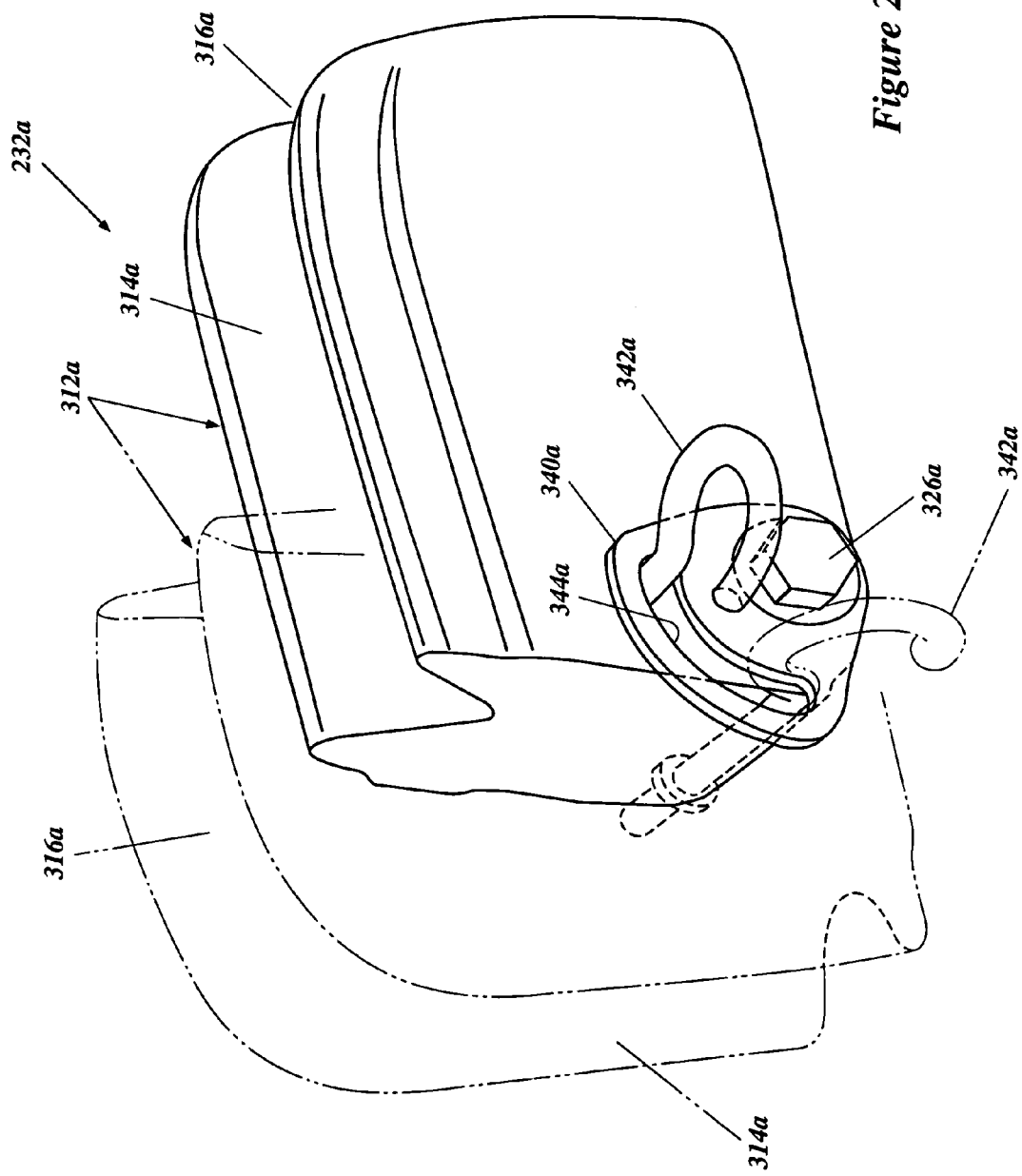
FIG. 25 is a perspective view of the spring support member of FIG. 24.

The spring support block 312a is pivotally coupled to the slide rail assembly 100a. A corner portion 320a of the spring support block 312a, located generally opposite the corner where the long and short spring support grooves meet, preferably is coupled to, and supported on, the slide rail assembly 100a such that the spring support block 312a pivots on the slide rail assembly 100a. As shown in FIG. 24, the corner portion 320a of the spring support block 312a preferably is pivotally supported on a collar 322a secured to the slide rail assembly 100a by a nut 324a and a bolt 326a.

With continued reference to FIG. 24, the spring support block 312a has a lock hole 330a and a lock pin 332a inserted in the lock hole 330a. The lock pin 332a has a distal end 334a that can protrude from, and retract into, the spring support block 312a. The lock pin 332a can engage a locator hole 336a in the slide rail assembly 100a. A guide plate 340a is disposed on the outside surface of the spring support block 312a. The guide plate 340a preferably is secured by the bolt 326a. The lock pin 332a has a base end 342a, protruding outward from an arcuate guide slot 344a formed through the guide plate 340a. The base end 342a of the lock pin 332a preferably has a hook shape to facilitate manipulation of the lock pin 332a. The lock pin 332a is biased toward the slide rail assembly 100a by a spring element 346a. The distal end 334a of the lock pin 332a preferably engages the locator hole 336a.

The spring support block 312a can be positioned in its vertical orientation (shown by solid lines in FIG. 22) when two people ride a vehicle. The spring support block 312a can be rotated to its horizontal orientation (shown by broken lines in FIG. 22) when one person rides the vehicle. The spring support block preferably is rotated by manually pulling the base end 342a of the lock pin 332a to overcome the biasing force of the spring element 346a. The lock pin 332a preferably is released from engagement with the slide rail assembly 100a. The lock pin 332a and spring support block 312a can be rotated to the desired vertical or horizontal orientation. When the spring support block 312a is rotated to the desired position, the spring element 346a biases the lock pin 332a into engagement with the locator hole 336a of the slide rail assembly 100a to lock the spring support block 312a in the desired position. The spring support block 312a can be easily rotated between the vertical and the horizontal orientations without the use of a tool. The spring support block 312a, in some embodiments, can also be locked in a plurality of positions between the vertical and horizontal orientations.

When two people are to ride the vehicle, the spring support blocks 312a can be oriented in the vertical orientation. In the vertical orientation, the spring support blocks 312a can contact the long end portions 204a of the torsion springs 142a before the slide rail assembly 100a is ever deflected. For example, the spring support blocks 312a can contact the long end portions 204a of the torsion springs 142a when there is no load on the vehicle (i.e., when nobody rides the vehicle). Thus, the corresponding spring reaction curve is represented by the dot-dashed line of FIG. 23. Orienting the spring support block 312a in the vertical orientation increases the spring reaction. Accordingly the suspension system is better able to support a larger load, such as that created when two people ride the vehicle. Additionally, changing the orientation of the spring support block acts to shift the load balance more toward the rear of the vehicle.

When one person is to ride the vehicle, the spring support blocks 312a are oriented in the horizontal orientation. In this position, the spring support blocks 312a contact the long end portions 204a of the torsion springs 142a at intermediate spring support locations 234a when the deflection of the slide rail assembly 100a is greater than a prescribed amount. In some embodiments, the prescribed amount preferably is a point relatively close to the point of maximum deflection of the slide rail assembly 100a. In such embodiments, the corresponding spring reaction curve is represented by the solid line of FIG. 23. In such cases, the spring reaction is small enough during most of the deflection range of the slide rail assembly 100a to provide a relatively flexible suspension system to provide for a comfortable ride. As the deflection of the slide rail assembly 100a reaches a point close to the maximum deflection of the slide rail assembly 100a, the spring reaction sharply increases to inhibit bottoming-out.

With reference to FIGS. 1-21, in one embodiment, the front and rear shock absorbers 134, 136 are connected to the linkage mechanism 140. With reference to FIG. 22, in another embodiment only the front shock absorber 134a is coupled to the linkage mechanism 140a. In the embodiment illustrated in FIG. 22, the first linkage member 194a is coupled to the front shock absorber 134a. The second linkage member 196a is coupled to the front suspension arm 130a. A third linkage member 200a couples the first and second linkage members 194a, 196a. In the embodiment shown in FIG. 22, the rear shock absorber (not shown) is coupled to the slide rail assembly 100a independent of the linkage system 140a.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present vehicle suspension system has been described in the context of particularly preferred embodiments, the skilled artisan will appreciate, in view of the present disclosure, that certain advantages, features and aspects of the suspension system may be realized in a variety of other applications, many of which have been noted above. For example, while particularly useful for snow vehicle suspension systems, the skilled artisan can readily adopt the principles and advantages described herein to a variety of other applications, including larger scale devices. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims that follow.

What is claimed is:

1. A vehicle comprising:
a frame;
a slide rail disposed below the frame for guiding a drive track along a road surface;
a front suspension arm having a first portion pivotally coupled to the frame at a front frame pivot location and a second portion pivotally coupled to the slide rail at a front rail pivot location;
a rear sliding arm having a first portion pivotally coupled to the frame at a rear frame pivot location and a second portion pivotally coupled to the slide rail at a rear rail pivot location;
a front shock absorber interposed between the slide rail and the frame;
a rear shock absorber interposed between the slide rail and the frame,
a linkage system comprising a plurality of linkage members, the linkage system being coupled to the slide rail, the front suspension arm, and the front shock absorber;
a spring member having a first portion mounted to the frame and a second portion extending from the first portion generally toward the slide rail;
a first spring support member coupled with the slide rail at a first spring support location and arranged to support the second portion of the spring member in a first position; and
a second spring support member coupled with the vehicle at a second spring support location and arranged to support the second portion of the spring member in a second position.

2. The vehicle of claim 1, wherein the first and second portions of the rear sliding arm are movable relative to each other such that a deflection of the slide rail causes a length of the arm between the frame pivot location and the rail pivot location to contract.

3. The vehicle of claim 1, wherein the second spring support member is arranged to engage the second portion of the spring member as the slide rail is deflected beyond a prescribed amount.

4. The vehicle of claim 1, wherein the linkage system is coupled to the front shock absorber at a first location and the linkage system is coupled to the rear shock absorber at a second location, the linkage system is arranged such that deflection of the slide rail within an initial range causes the distance between the first location and the second location to decrease, and deflection of the slide rail within a subsequent range causes the distance between the first location and the second location to increase.

5. A vehicle comprising:
a frame;
a slide rail assembly disposed below the frame for guiding a drive track along a road surface, the slide rail assembly having at least a pair of slide rails and at least one cross member extending between the pair of slide rails; and
an arm having a first portion pivotally coupled to the frame at a frame pivot location and a second portion pivotally coupled to the cross member at a rail pivot location between the pair of slide rails, the first and second portions being movable relative to each other such that vertical movement of the slide rail causes a length of the arm between the frame pivot location and the rail pivot location to extend or contract, wherein the arm has a minimum and maximum length, the arm further includes an adjustment member configured to translate axially relative to the arm for changing the minimum or maximum length of the arm.

6. The vehicle of claim 5, wherein the arm is located near a rear portion of the vehicle.

7. The vehicle of claim 6, additionally comprising a second arm having a first portion pivotally coupled to the frame at a front frame pivot location and a second portion pivotally coupled to the slide rail at a front rail pivot location.

8. The vehicle of claim 7, additionally comprising a front shock absorber interposed between the slide rail and the frame at the front frame pivot location, a rear shock absorber is interposed between the slide rail and the frame at the frame pivot location.

9. The vehicle of claim 8, wherein the rear arm comprises a first member and a second member arranged side by side and coupled to each other with a bracket, and wherein the rear shock absorber is connected to the bracket.

10. A method of operation of a vehicle having a frame, a slide rail, an arm having a first portion pivotally coupled to the frame at a rear frame coupling location and a second portion pivotally coupled to the slide rail at a rear rail coupling location, the arm having an adjustment member, the method comprising the steps of:
translating the adjustment member of the arm axially relative to the arm for setting a desired minimum or maximum distance between the rear frame coupling location and rear rail coupling location;
deflecting the slide rail within a first range whereby the distance between the rear frame coupling location and the rear rail coupling location decreases; and
deflecting the slide rail within a second range wherein the distance between the rear frame coupling location and the rear rail coupling location is maintained generally constant.

11. The method of claim 10, wherein the first range is an initial range of deflection and the second range is a latter range of deflection.

12. The method of claim 10, wherein the vehicle additionally comprises a shock absorber coupled to the arm, wherein the shock absorber is compressed a first amount during the first range of deflection and the shock absorber is compressed a second amount during the second range of deflection, the second amount being greater than the first amount.

13. The vehicle of claim 1, wherein the linkage system is coupled to the rear shock absorber.

14. The vehicle of claim 1, wherein the linkage system comprises a first linkage member, a second linkage member, and a third linkage member;
wherein a first portion of the first linkage member is coupled to a first portion of the front shock absorber at a first linkage coupling point a second portion of the first linkage member is pivotally coupled to the slide rail at a second linkage coupling point, a third portion of the first linkage member is coupled to a first portion of the third linkage member at a third linkage coupling point, a first portion of the second linkage member is pivotally coupled to the slide rail at the front rail pivot location, a second portion of the second linkage member is coupled to a second portion of the third linkage member at a fourth linkage coupling point.

15. The vehicle of claim 14, wherein a third portion of the third linkage member is coupled to the rear shock absorber at a fifth linkage coupling point.

16. The vehicle of claim 5 wherein the adjustment member is a nut threaded onto the arm.

17. The vehicle of claim 5, wherein the first portion of the arm and the second portion of the arm are coaxial.

18. The vehicle of claim 17 wherein the second portion of the arm is configured to slide inside the first portion of the arm.

19. The vehicle of claim 17 wherein a bushing is coupled to the first or second portion of the arm for separating the first portion of the arm from the second portion of the arm.

20. The method of claim 10, wherein the adjustment member is a nut threaded onto the arm, and the nut is translated axially relative to the arm by rotating the nut relative to the arm.

* * * * *